US006010426A

United States Patent [19]

Nakamura

[11] Patent Number: 6,010,426

[45] Date of Patent: Jan. 4, 2000

[54] LOCK DEVICE OF OUTPUT SHAFT

[76] Inventor: Daijiro Nakamura, 662-2, Shimogishi-cho, Ono-shi, Hyogo-Pref, Japan

[21] Appl. No.: 08/947,548

[22] Filed: Oct. 11, 1997

[51] Int. Cl.[7] .......... H02P 3/04

[52] U.S. Cl. .......... 477/22; 475/264; 475/900; 192/223.1; 192/56.62; 188/189

[58] Field of Search .......... 477/21, 22, 199; 475/263, 264, 900; 192/223.1, 56.62; 188/180, 184, 185, 189

[56] References Cited

U.S. PATENT DOCUMENTS

| | | | |
|---|---|---|---|
| 2,873,832 | 2/1959 | Helm | 192/223.1 |
| 2,995,226 | 8/1961 | Gilder | 192/223.1 |
| 3,976,172 | 8/1976 | F'Geppert | 192/223.1 |
| 3,999,642 | 12/1976 | Johnson | 192/56.62 X |
| 5,624,013 | 4/1997 | Tsai | 192/223.1 |

*Primary Examiner*—Sherry L. Estremsky
*Attorney, Agent, or Firm*—Moonray Kojima

[57] ABSTRACT

A lock device for an output shaft, wherein an output shaft is formed by connection of a driving shaft and a driven shaft, a play angle for not transmitting power for a specified angle in mutual rotating directions is formed in the connection area for connecting the driving shaft and driven shaft, a locking mechanism for locking by moving a lock member arrested on the driven shaft and held movably inward and outward in the radial direction is provided at the driven shaft side, and an unlocking mechanism for unlocking by moving the lock member of the locking mechanism in an unlocking direction within the rotating amount of the play angle is provided in the driving shaft.

23 Claims, 26 Drawing Sheets

LOCK DEVICE OF OUTPUT SHAFT

TECHNICAL FIELD OF THE INVENTION

The invention relates to a lock device of an output shaft capable of stopping the output shaft promptly when the motor is stopped and braked, for example, in an output shaft for issuing the torque of a motor.

PRIOR ART

For example, by attaching a chuck to the output shaft of a power tool, when hand work is done by mounting various tools, if the power switch is turned off, the output shaft continues to rotate by inertia of the chuck or tool, and if the power tool is released during such rotation, it is very dangerous because the tool is rotating. It is hence desired that the output shaft stop promptly when the power switch is turned off.

Relating to such chuck, there is a chuck having a torque-up function for tightening or detaching the tool by turning the operation ring manually without using a chuck handle, but when this chuck with torque-up function is used, since the output shaft of the power tool is free to rotate if the motor power source is turned off, if attempted to tighten the chuck by hand, the output shaft also rotates, and it cannot be tightened by hand, and it is hence necessary to fix the output shaft by one hard, and it requires the job for tightening the chuck by hand and holding the tool, thereby impairing the working efficiency. It is accordingly preferred that the output shaft of the power tool should be locked while the motor power source is turned off.

PURPOSE OF THE INVENTION

It is hence an object of the invention to present a lock device of output shaft capable of stopping the output shaft promptly when the output shaft is stopped and braked, locking so that the output shaft may not rotate while the output shaft is stopped, locking securely, and unlocking smoothly.

SUMMARY OF THE INVENTION

To achieve the above object, the invention provides a lock device of output shaft, wherein an output shaft is formed by connection of a driving shaft and a driven shaft, a play angle for not transmitting power for a specified angle in mutual rotating directions is formed in the connection area for connecting the driving shaft and driven shaft, a locking mechanism for locking by moving a lock member arrested on the driven shaft and held movably inward and outward in the radial direction is provided at the driven shaft side, and an unlocking mechanism for unlocking by moving the lock member of the locking mechanism in an unlocking direction within the rotating amount of the play angle is provided in the driving shaft.

EMBODIMENT 1

Figure 1:
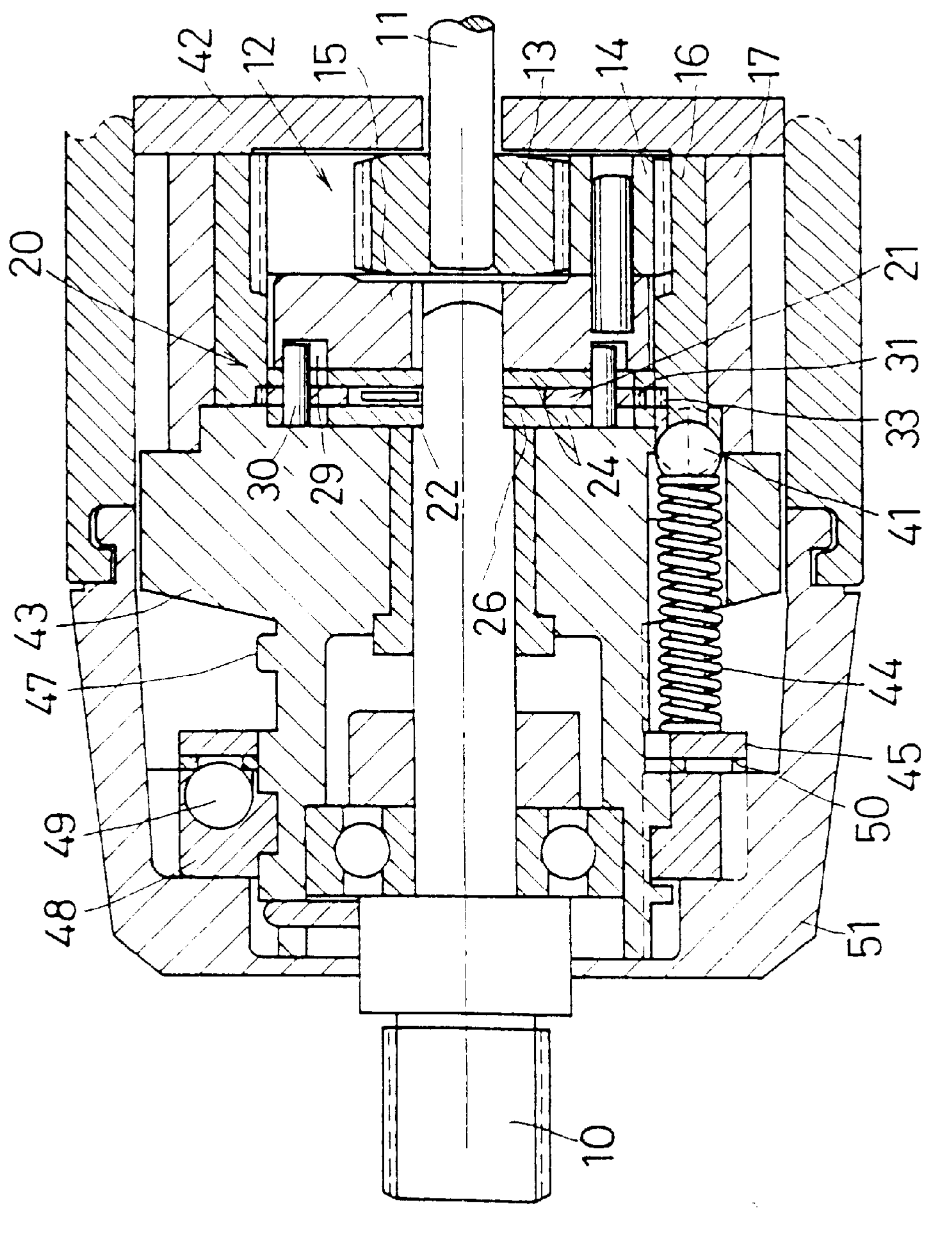
FIG. 1 is a sectional view of a lock device of output shaft in a first embodiment.

An embodiment of the invention is specifically described below by referring to the accompanying drawings. FIG. 1 through FIG. 11 show a first embodiment, and this embodiment is an example of applying the lock device of output shaft of the invention in an output shaft of a hand-held power tool, and in FIG. 1, an output shaft 10 is driven by rotation of a motor shaft 11 of a motor (not shown), and the lock device incorporating a reduction mechanism is placed between the motor shaft 11 and output shaft 10.

The motor shaft 11 is transmittably connected to a sun gear 13 of a planetary gear mechanism 12. The planetary gear mechanism 12 is composed of, aside from the sun gear 13, a planetary gear 14 engaged with the sun gear 13, a carrier 15 supporting the planetary gear 14, an internal gear 16 engaged with the planetary gear 14, and a fixed ring 17, and has a known reduction function, and its reduced output is issued from the carrier 15.

Figure 2:
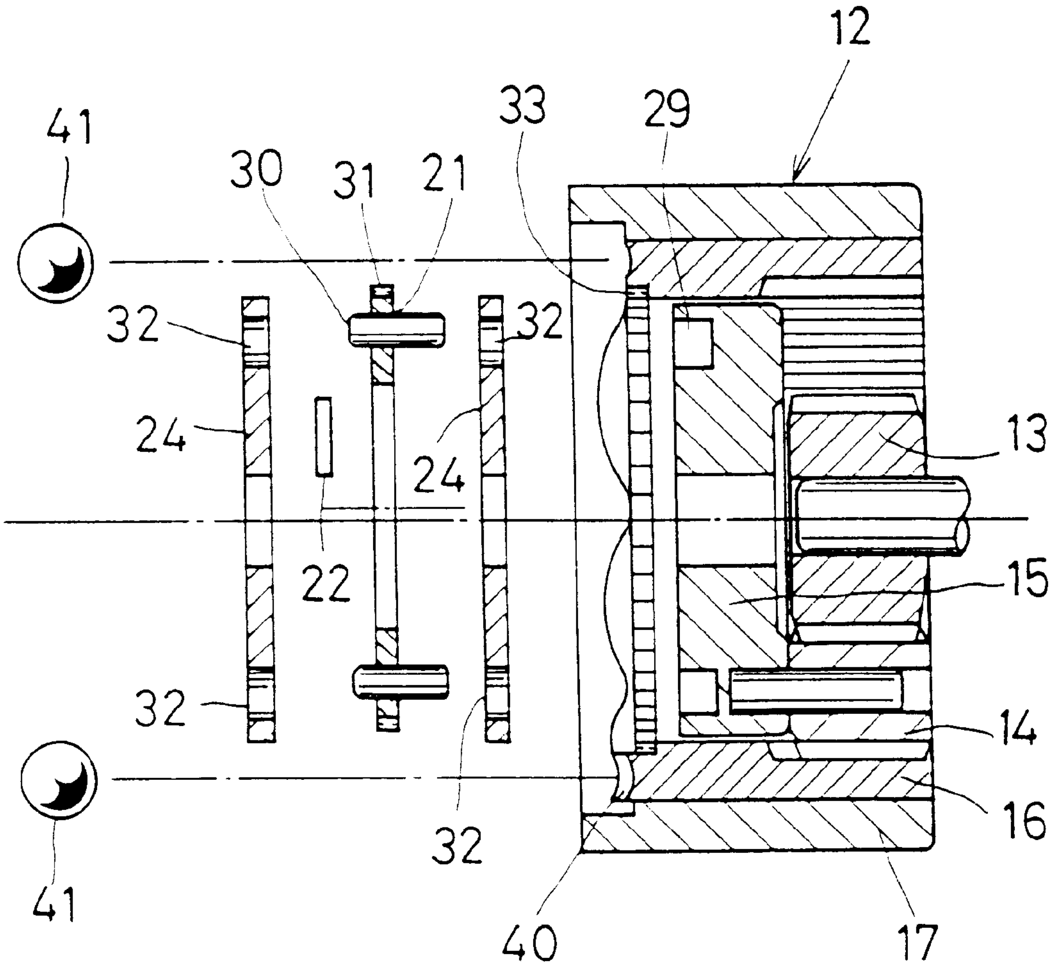
FIG. 2 is a partial exploded view of the lock device portion.

As shown also in FIG. 2, a lock device 20 for locking the output shaft 10 is composed of the carrier 15, a lock ring 21 opposite thereto in the core direction, two disk-shaped holding plates 24, 24 for holding it from both sides, and the internal gear 16 for locking the rotation of the lock ring 21.

Figure 3:
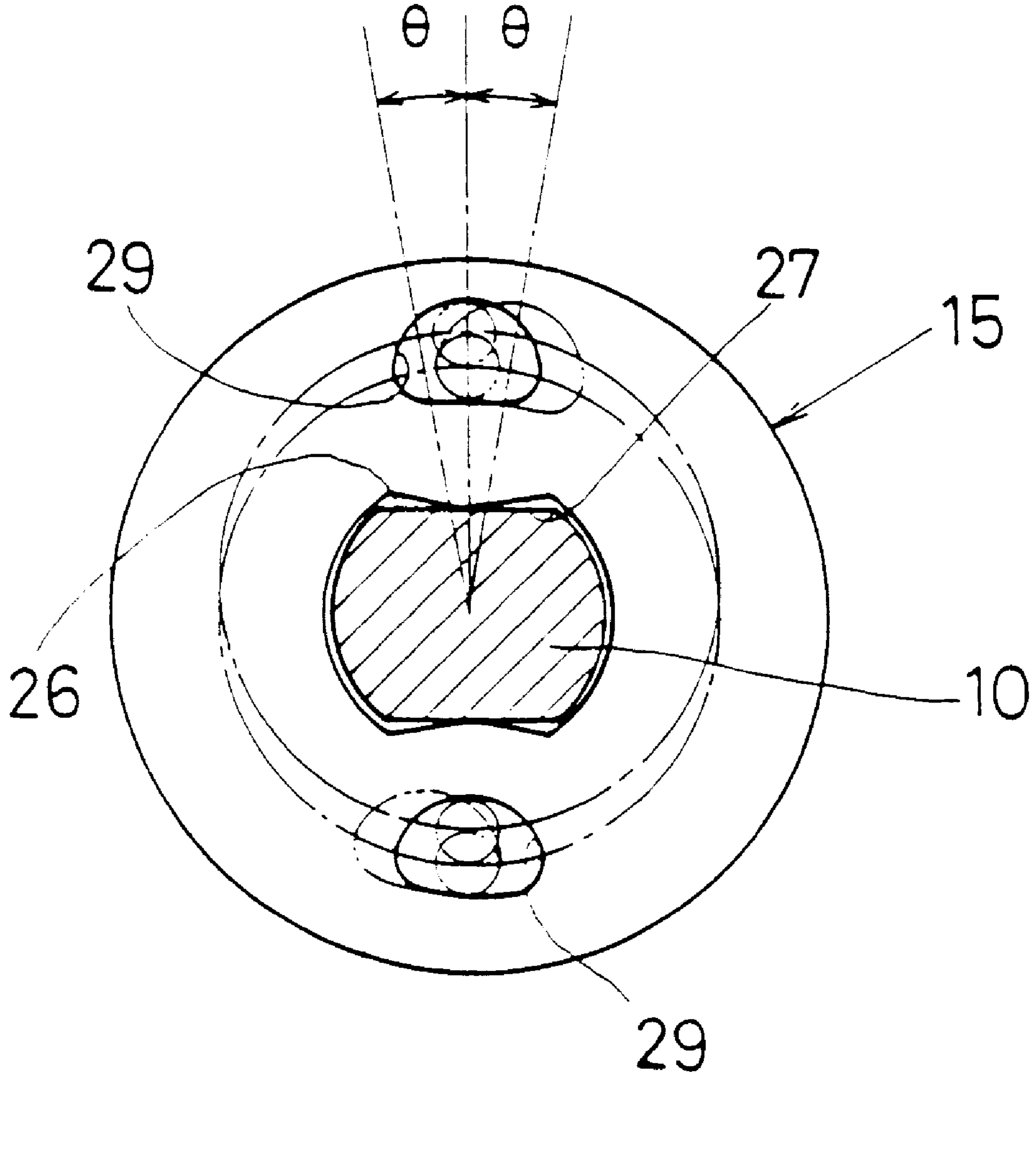
FIG. 3 is a front view of a carrier.

As shown in FIG. 3, the core portion of the carrier 15 and the inner end of the output shaft 10 are mutually fitted and is connected transmittably, and this fitting structure forms a linkage fitting portion 26 by forming two opposite positions across the core in a plane, in a specified range in the core direction of the inner end of the output shaft 10, and in the linkage fitting portion 27 of the carrier 15 to be fitted thereto, a play angle for not transmitting for the portion of a specified angle θ is formed in the mutually normal and reverse rotating directions from the neutral position.

In FIG. 2, the central portion of the two holding plates 24, 24, forms a linkage fitting portion 28 (see FIG. 6) for fitting with the linkage fitting portion 26 of the output shaft 10 in a play-free state, and rotates integrally with the output shaft 10.

Supposing the carrier 15 to be the driving side, the output shaft 10 may be called the driven side, and the holding plates 24, 24 are fixed to the inner end side of the output shaft 10 of the driven side opposite to the carrier 15 at the driving side in the core direction.

Further as shown also in FIG. 3, on the side surface of the outside (left side in the drawing) of the carrier 15, to clear the locked state of the lock ring 21, cam holes 29, 29 are formed in one direction having inclined inner walls at opposite positions across the core, and pins 30, 30 of the lock ring as mentioned below are inserted into the cam holes 29, 29, and when the carrier 15 is rotated in the driving direction, the inclined inner walls of the cam holes 29, 29 abut against the pins 30, 30, thereby moving them from the locking position side of the lock ring 21 to the unlocking position side. Therefore, the cam hole 29 and pin 30 form an unlocking mechanism.

Figure 4:
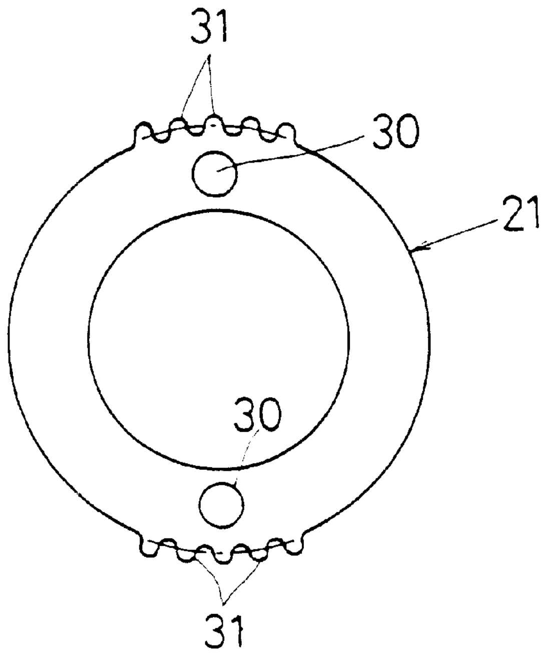
FIG. 4 is a front view of a lock ring.
Figure 5:
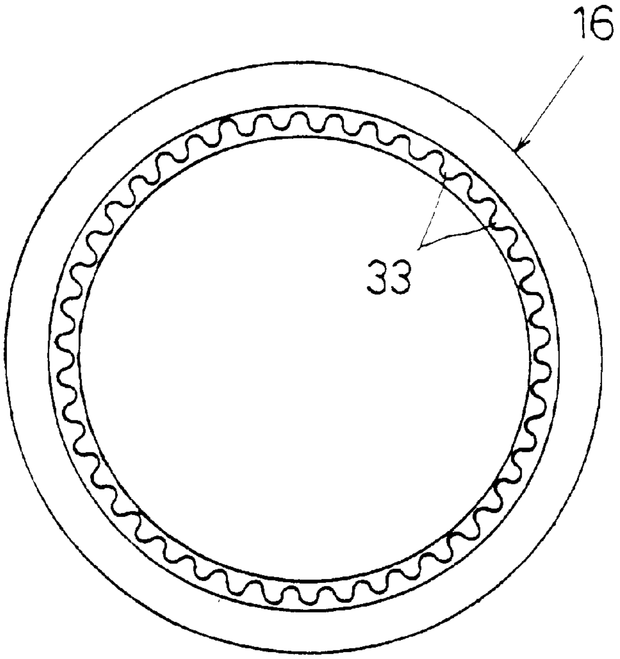
FIG. 5 is a front view of an internal gear.

As shown also in FIG. 4, at two outer circumferential positions opposite across the core of the lock ring 21, five lock pawls 31 are formed each, and at the inside positions of the individual lock pawls 31, the pins 30, 30 are planted at the intermediate positions of the five lock pawls 31, and one end portion is extended up to the cam holes 29, 29 of the carrier 15.

When the one side of the lock pawls 31 (for example, the upper side in the drawing) of the lock ring 21 is eccentrically moved to the lock position side set outside in the radial direction, the lock pawls 31 and a gear 33 (see FIG. 5) formed on the inner circumference of the internal gear 16 are engaged with each other, so that the rotation of the lock ring 21 may be locked. Therefore, the lock pawl 31 and gear 33 form a locking mechanism.

Although the gear 33 of the internal gear 16 is formed in the shape of an ordinary inner gear, since the lock pawls 31 of the lock ring 21 are formed in a shape to be engaged with the gear 33, when the gear 33 is engaged with five lock pawls 31, five of them are engaged in a uniform contact, and the rotation load in locking is evenly received in the five lock pawls 31, so that a necessary strength may be obtained.

Incidentally, when the lock pawls 31 are formed as an outer gear, one of the five lock pawls 31 strongly contact with one gear 33 of the internal gear 16, and receives a centralized rotation load, and hence a greater strength is required in the gear 33 and lock pawls 31.

The lock pawls 31 are formed at two mutually opposite positions of the lock ring 21 because, when the lock ring 21 is rotated, aside from moving into the central unlocking position by the centripetal motion, the assembling is facilitated by allowing the directivity of the lock ring 21 in two directions when assembling, and moreover, in case trouble occurs in the pawls 31 at one side, the lock pawls 31 of the other side can be used.

Figure 6:
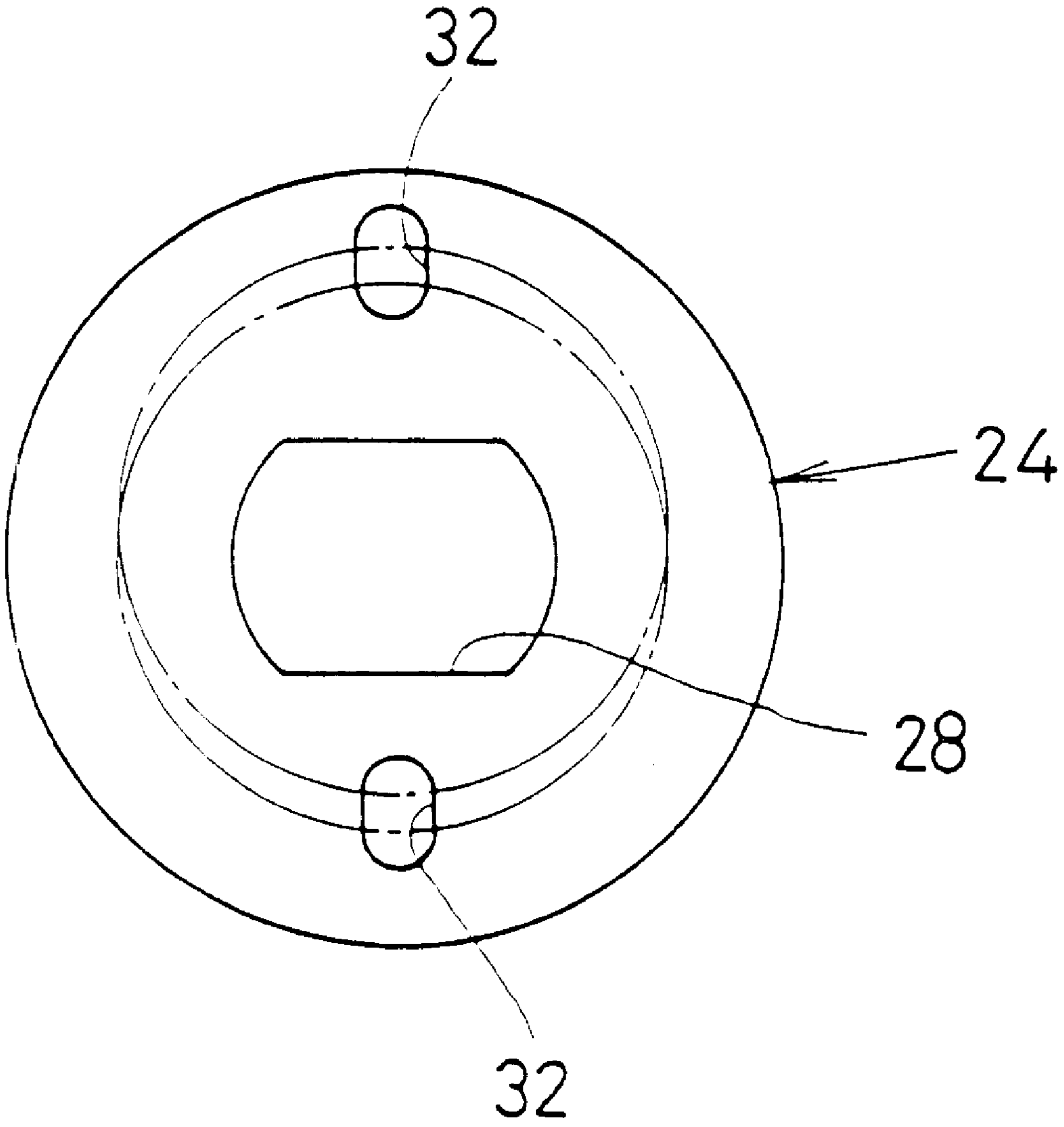
FIG. 6 is a front view of a holding plate.

FIG. 6 shows the holding plates 24, and since the two holding plates 24 and 24 are identical structure, only one is shown.

The holding plate 24 forms a linkage fitting portion 28 rotating integrally by fitting without play to the linkage fitting portion 26 of the output shaft 10, at its core, and forms oval guide holes 32, 32 for guiding the sliding of the pins 30, 30 inward and outward in the radial direction, at positions opposite to the pins 30, 30 of the lock ring 21.

Therefore, the pins 30, 30 of the lock ring 21 are inserted from right and left into the guide holes 32, 32 of the two holding plates 24, 24, and the lock ring 21 is held slidably between the lock position outside of the radial direction, and the unlock position at the inside (the core side).

The lock ring 21 may be also held by either one of the holding plates 24.

Figure 7:
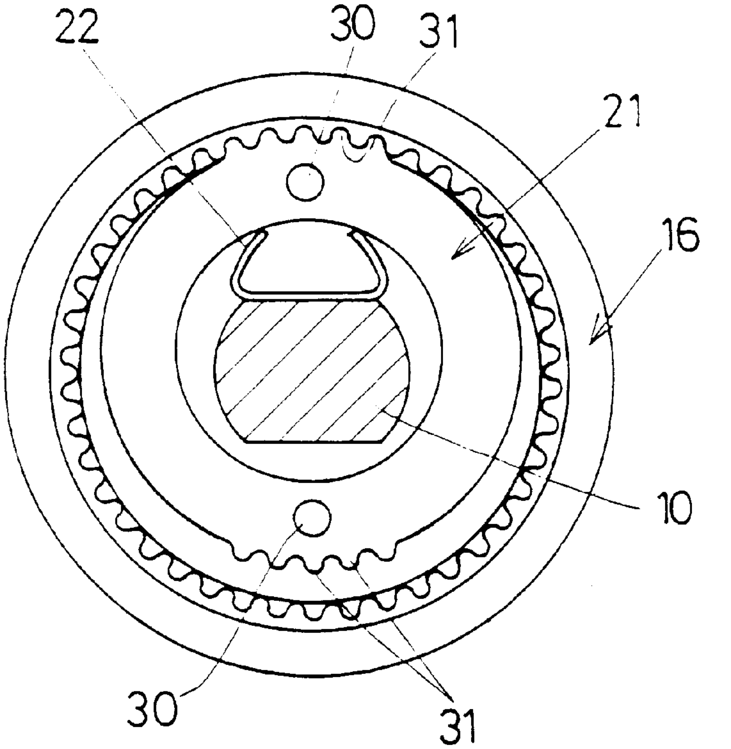
FIG. 7 is a front view showing a locked state of the lock device.

As shown also in FIG. 7, between the inner circumferential portion of the lock ring 21 and the plane portion of the linkage fitting portion 26 of the output shaft 10, there is a spring member 22 in the form of ox horn thrusting the lock pawls 31 at one side (lock side) of the lock ring 21 to the lock position.

Figure 8:
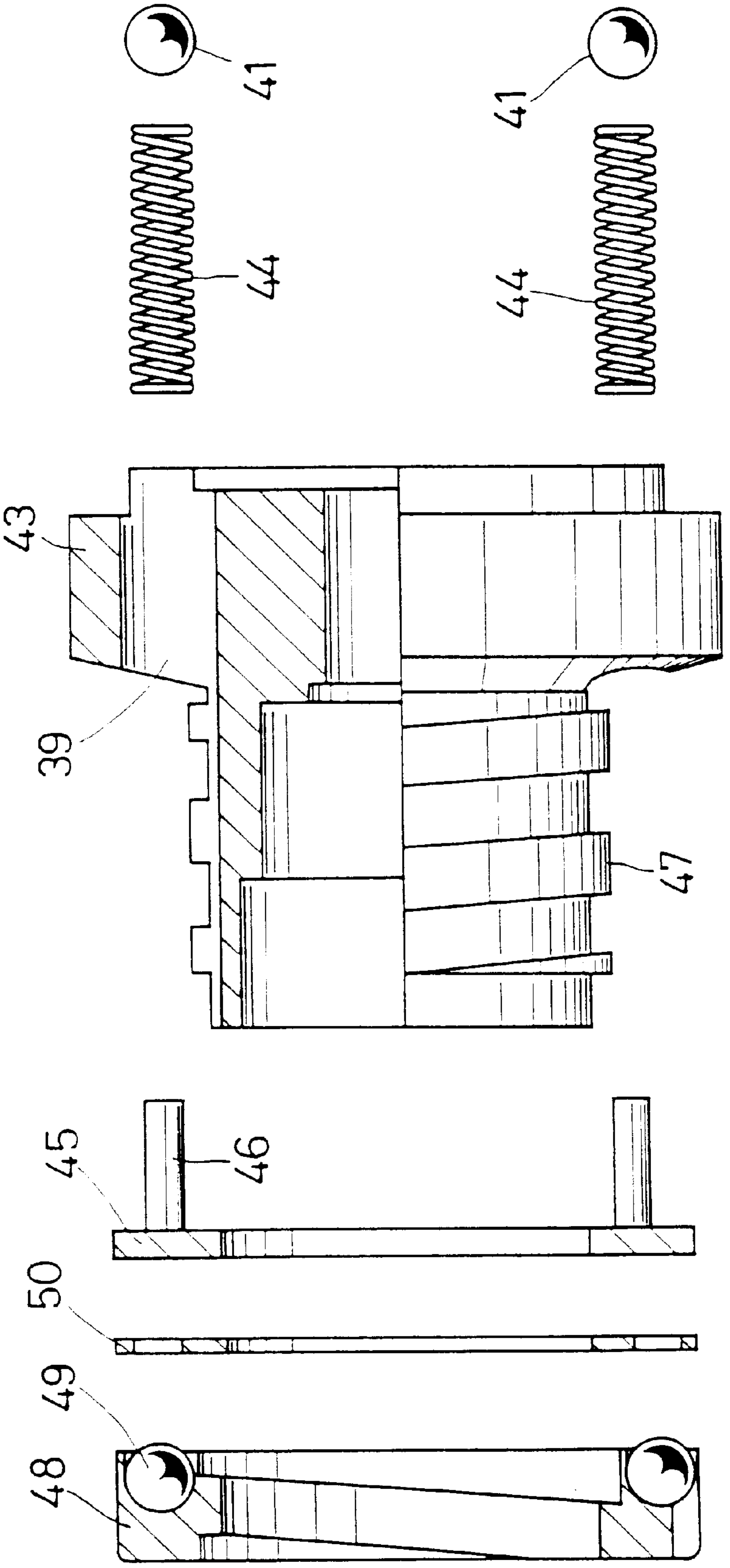
FIG. 8 is an exploded view of torque limiter mechanical portion.

As shown in FIG. 1, FIG. 2, and FIG. 8, in the planetary gear mechanism 12, the internal gear freely supports the fixed ring 17, the outer end of the internal gear 16 is formed on a rough surface 40, and a ball 41 is pressed thereto to push the internal gear 16 to the fixing plate 42 side, and by defining its rotation, a torque limiter is composed.

A plurality of balls 41 (for example, six) confront, and at the position confronting the outer end of the internal gear 16, a fixing member 42 is set against, and at the side confronting the internal gear 16 of the fixing member 43, and at the position corresponding to the ball 41, a storage hole 38 is formed for storing a spring 44 for pressing the ball 41, and the outer end of the spring 44 is held as a support pin 46 of a receiving member 45 is inserted.

On the outer circumference of the fixing member 43, a screw 47 of square threads is formed, and this screw 47 is matched with a nut member 48, and this nut member 48 is moved back and forth by a ball 49 and a ring 50 to move the receiving member 45 in the axial direction, and by adjusting the elasticity of the spring 44, the torque of the torque limiter by the ball 41 and the rough surface 40 of the internal gear 16 can be adjusted.

The nut member 48 is connected so that rotation may be transmitted in a state of allowing sliding in the axial direction by, for example, spline fitting, and by rotating an operation cover 51, the nut member 48 can be rotated. The fixed plate 42, fixed ring 17, and fixing member 43 are integrally coupled by proper linkage mechanism, and is composed in a stationary state.

The operation of the lock device 20 of the output shaft 10 thus constituted is described below.

Figure 9:
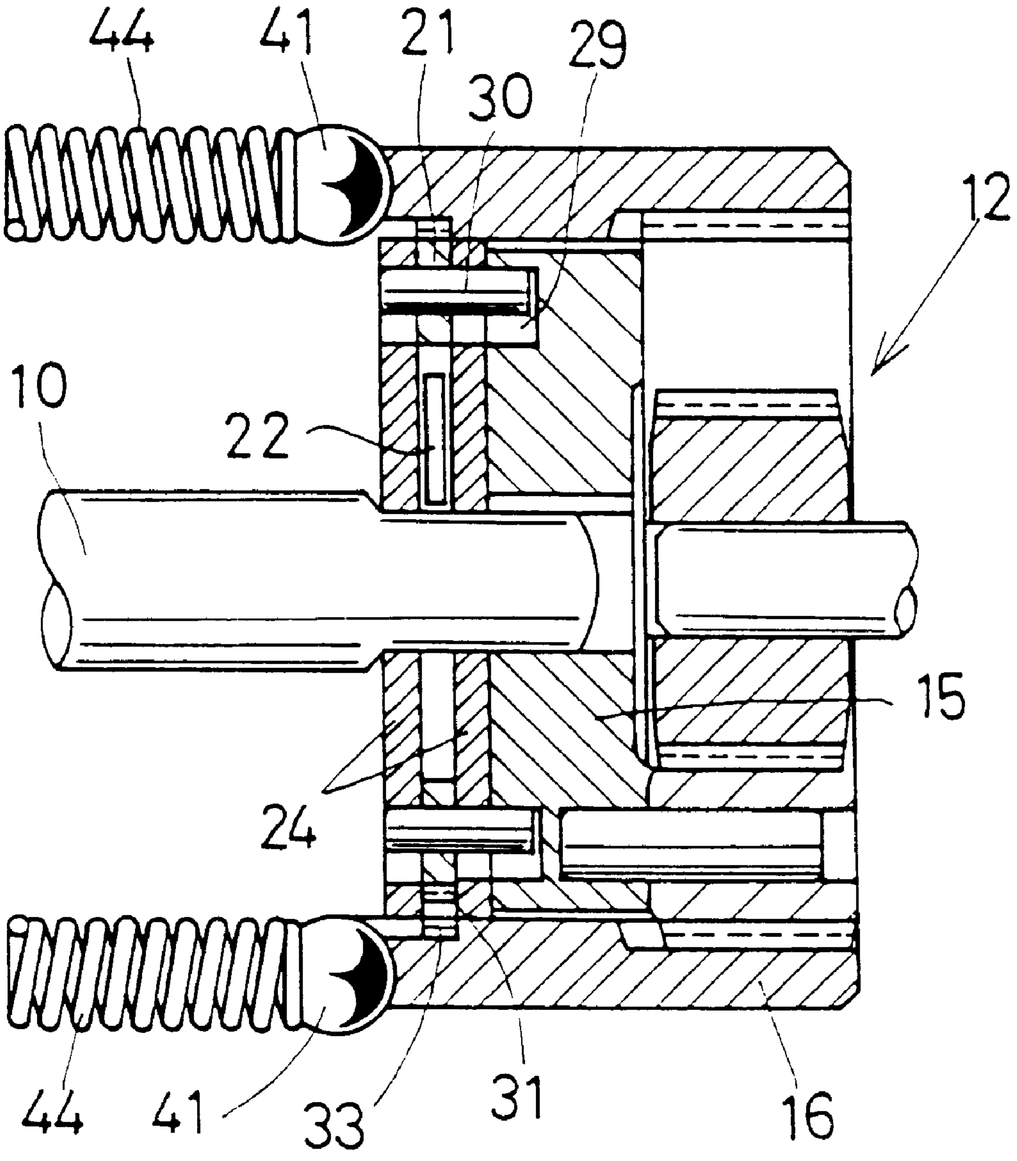
FIG. 9 is a sectional view showing a locked state of the lock device.

In FIG. 1, FIG. 7, and FIG. 9, the motor shaft 11 is stopped, and the positions of the pins 30, 30 of the lock ring 21, and cam holes 29, 29 of the carrier 14 are at positions for disposing the pins 30 in the upper part of the center of the cam holes 29 shown in FIG. 3, and therefore the lock ring 21 is thrust to the outer side in the radial direction by the spring member 22, and the lock pawl 31 of the lock side of the lock ring 21 is engaged with the gear 33 of the internal gear 16 of which rotation is defined, so as to be in a locked state as shown in FIG. 7.

In this state, when rotation is applied from the output shaft 10 side, for example, in a normal or reverse direction by hand, since there is no play angle θ against the holding plate 24, this holding plate 24 receives the torque of the output shaft 10, and the torque is transmitted to the lock ring 21 through the guide hole 32 of the holding plate 24 and the pin 30 of the lock ring 21.

However, since the lock pawl 31 of the lock side of the lock ring 21 is engaged with the gear 33 of the internal gear 16 defined of rotation by the elasticity of the spring 44 as mentioned above, it is not rotated. Therefore, the output shaft 10 remains in a locked state, and its manual rotation is prevented.

As mentioned above, while the rotation of the output shaft 10 is in the locked state, when mounting a tool on this output shaft 10, it is easy to mount because the output shaft 10 is not turned.

The rotation load applied to the lock pawl 31 is in the circumferential direction, and the engagement direction of the lock pawl 31 is the radial direction, and therefore the lock pawl 31 will be dislocated from the gear 33 or engaged permanently with the gear 33 by this rotation load.

When the manual rotation of the output shaft 10 exceeds the elastic force of the spring 44, the internal gear 16 rotates by overcoming the pressure of the spring 44, and the torque limiter functions.

In this way, when driving the output shaft 10 in a locked state, the motor is driven in the locked state and the motor shaft 11 is rotated in a specified driving direction, so that the locked state is cleared automatically.

Figure 10:
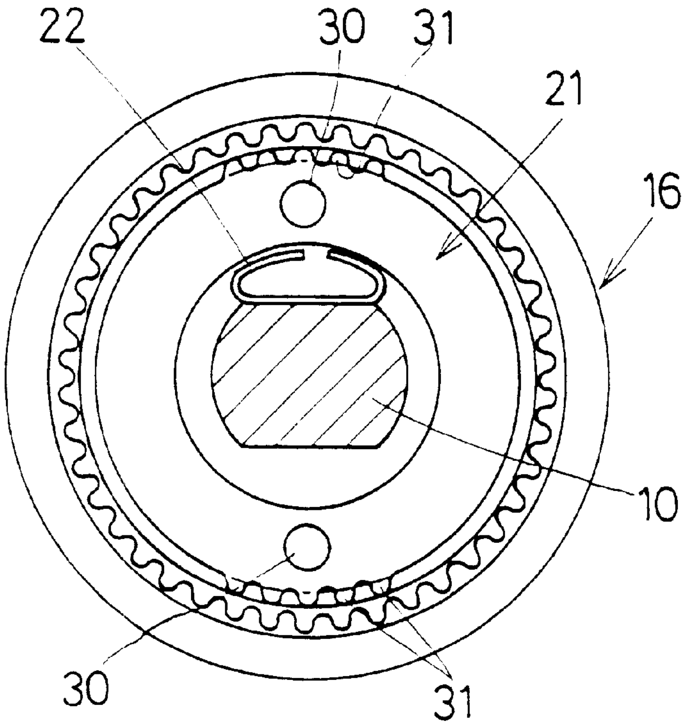
FIG. 10 is a front view showing an unlocked state of the lock device.
Figure 11:
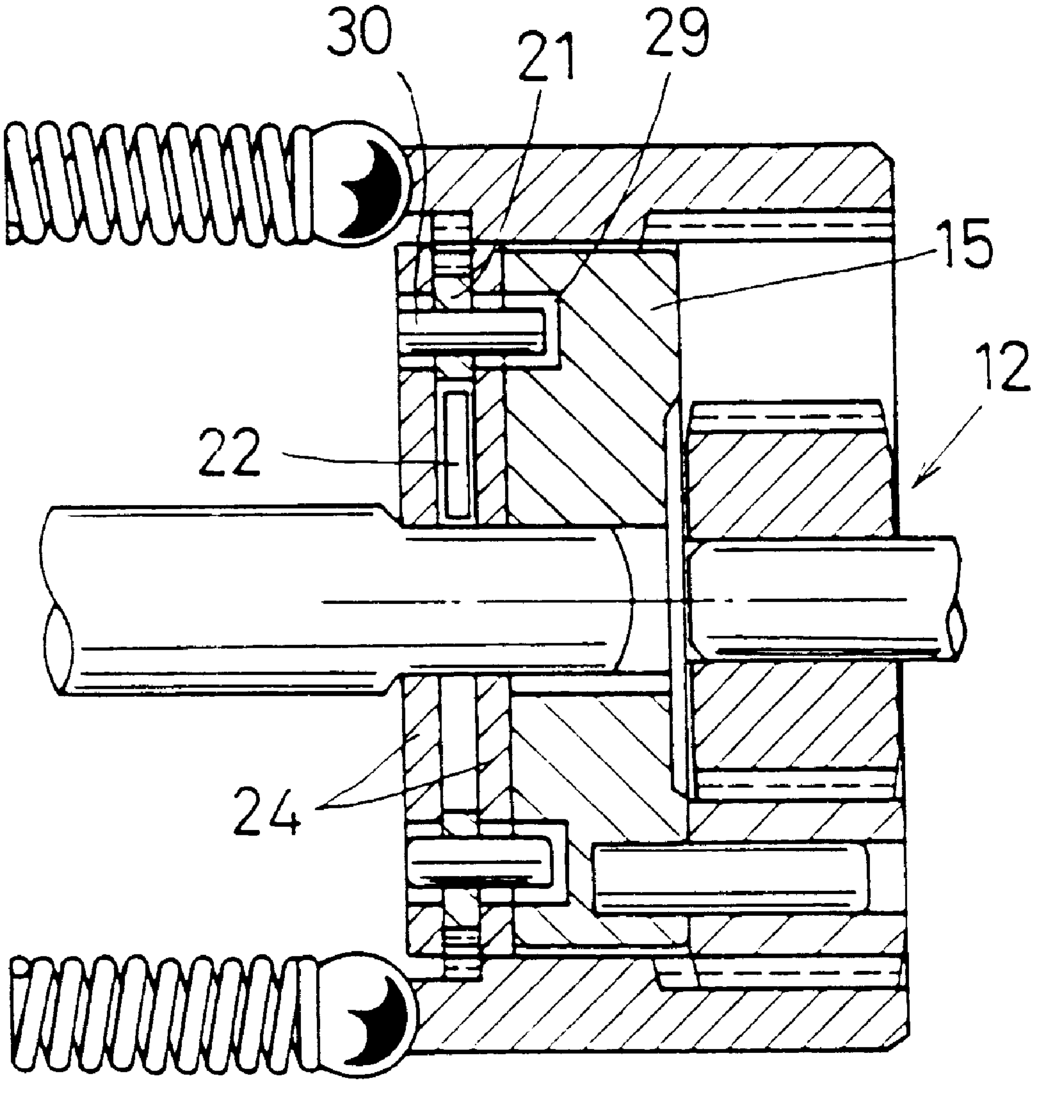
FIG. 11 is a sectional view showing an unlocked state of the lock device.

As shown in FIG. 10 and FIG. 11, the rotation of the motor shaft 11 is reduced by the planetary gear mechanism 12, and is delivered from the carrier 15, but since there is a play angle θ between the carrier 15 and the linkage fitting portions 26, 27 of the output shaft 10, after the carrier 15 rotates for the portion of this play angle θ, the torque is transmitted to the output shaft 10.

While the carrier 15 is rotating for the portion of the play angle θ, the inclined inner walls of the cam holes 29, 29 of the carrier 15 work to transfer the pins 30, 30 of the lock ring 21 to the unlocking position side inside in the radial direction. By the action of the cam holes 29, 29, the lock ring 21 is transferred to the unlocking position of the core side by overcoming the spring member 22, and the lock pawl 31 is dislocated from the gear 33 of the internal gear 16, so that the rotation of the output shaft 10 is permitted.

In this case, when the torque is transmitted to the lock ring 21 (transmission from the holding plate 24 side), since the lock ring 21 is formed in a uniform ring on the circumference, the rotation produces a centripetal force to rotate concentrically with the output shaft 10, and hence the lock pawl 31 at the outer circumference will not be engaged with the gear 33 of the internal gear 17.

As a result, the unlocked state of the lock ring 21 is maintained, and the output shaft 10 is rotated by the driving force of the motor shaft 11. In the driving state of the output shaft 10, when the output shaft 10 is overloaded, and this load exceeds the elastic force by the spring 44, the internal gear 16 begins to rotate by overcoming the pressure of the spring 44, so that the torque limiter functions.

Consequently, when the rotation of the motor shaft 11 is stopped by stopping the motor in a driving state, the torque of the motor shaft 11 declines, and the output shaft 10 side inertia increases and the rotation of the output shaft 10 exceeds the carrier 15, and by this rotation the mutual play angle θ retrogrades, thereby clearing the definition of the pins 30, 30 of the lock ring 21 by the cam holes 29, 29 of the carrier 15, and the pins 30, 30 are returned to the neutral position by the centrifugal force or thrusting force of the spring member 22, so that the lock ring 21 is transferred to the lock position at the eccentric position side. As a result, the lock pawl 31 of the lock side of the lock ring 21 is engaged with the gear 33 of the internal gear 16 being defined of rotation to be in the locked state.

Therefore, the rotation of the output shaft 10 is stopped immediately when the motor shaft 11 stops, and rotation by inertia does not occur, so that safety is enhanced.

When stopped without inertia occurring in the output shaft 10, by turning the output shaft 10 by hand in the direction of inertia, the lock action is obtained in the same manner as above. When the rotation by inertia of the output shaft 10 exceeds the elastic force by the spring 44, the internal gear 16 rotates by overcoming the pressure of the spring 44, so that the torque limiter function.

In this embodiment, when the rough surface 40 of the inner end side of the internal gear 16 is formed in a plane and the ball 41 is replaced by a brake pad, a brake mechanism is formed in the area, so that the torque limiter can be composed as brake mechanism.

Furthermore, by planting a pin 30 at the carrier 15 side and forming a cam hole 29 in reverse triangular form at the lock ring 21 side, an unlocking mechanism can be composed.

EMBODIMENT 2

FIG. 12 to FIG. 21 show a second embodiment, and constituent elements having the same function as in the first embodiment are identified with same reference numerals and a detailed description thereof is omitted.

This embodiment also relates to an example of applying the lock device of output shaft of the invention in an output shaft of a hand-held power tool, and as shown in FIG. 12, FIG. 13, FIG. 14, and FIG. 15, the lock device 20 for locking the output shaft 10 is composed of the carrier 15, two lock plates 21, 21 opposite thereto in the core direction, being divided in the radial direction, spring members 22, 22 in a coil spring form for thrusting the lock plates 21, 21 to the lock position outward in the radial direction, a fixed inner tooth ring 23 forming inner teeth for locking the rotation of the lock plates 21, 21 on the outer circumference of the lock plates 21, 21, being coupled and fixed to the fixed ring 17, and two holding plates 24, 24 for holding the lock plates 21, 21 at the mutually confronting inner sides, and this lock device 20 also comprises a lock operation mechanism 25 for locking by releasing manipulation of an unlocking operation.

Figure 16:
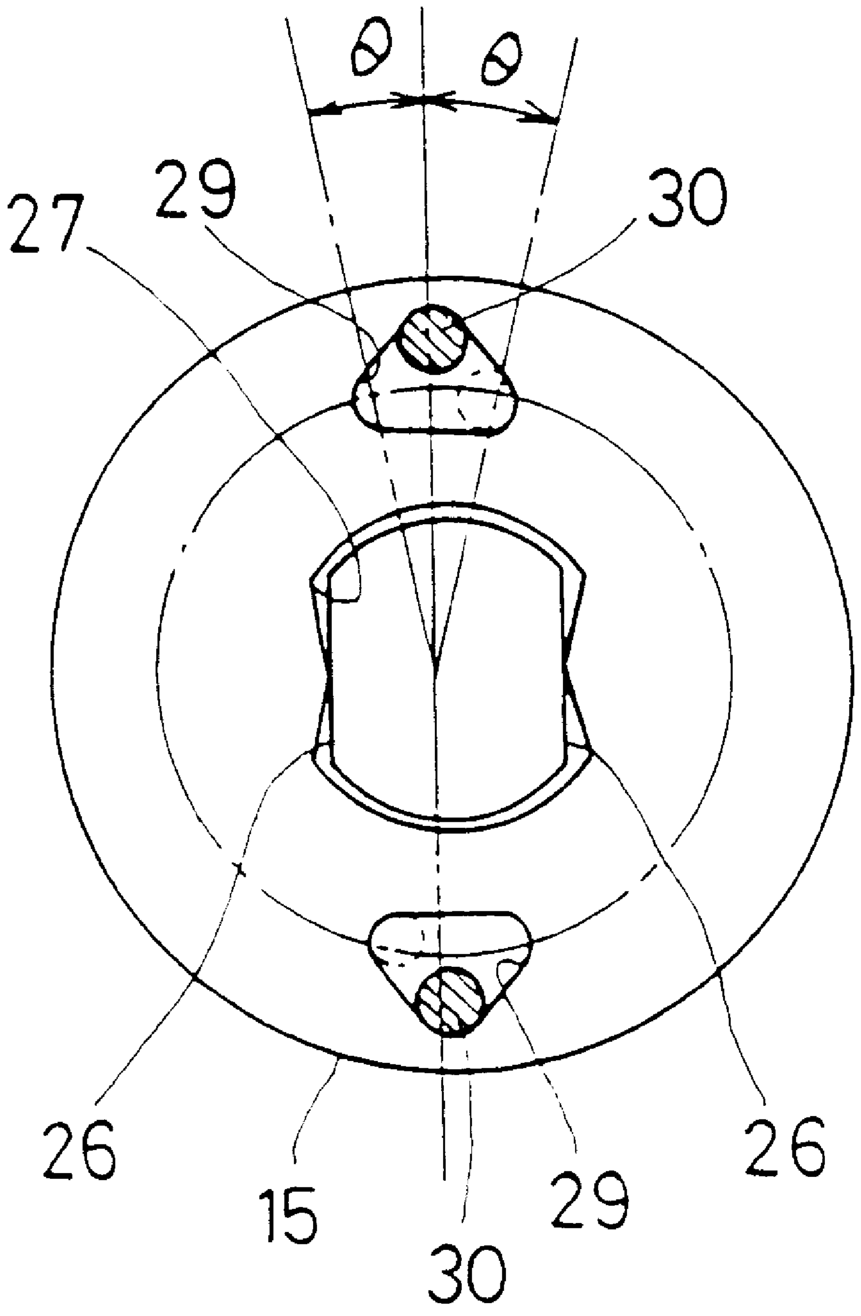
FIG. 16 is a front view of a carrier.

As shown in FIG. 16, the core portion of the carrier 15 and the inner end portion of the output shaft 10 are fitted mutually and connected transmittably, by forming a play angle for not transmitting for a specified angle θ in the normal and reverse rotating directions mutually from the neutral position, in their linkage fitting portions 26, 27.

Figure 17:
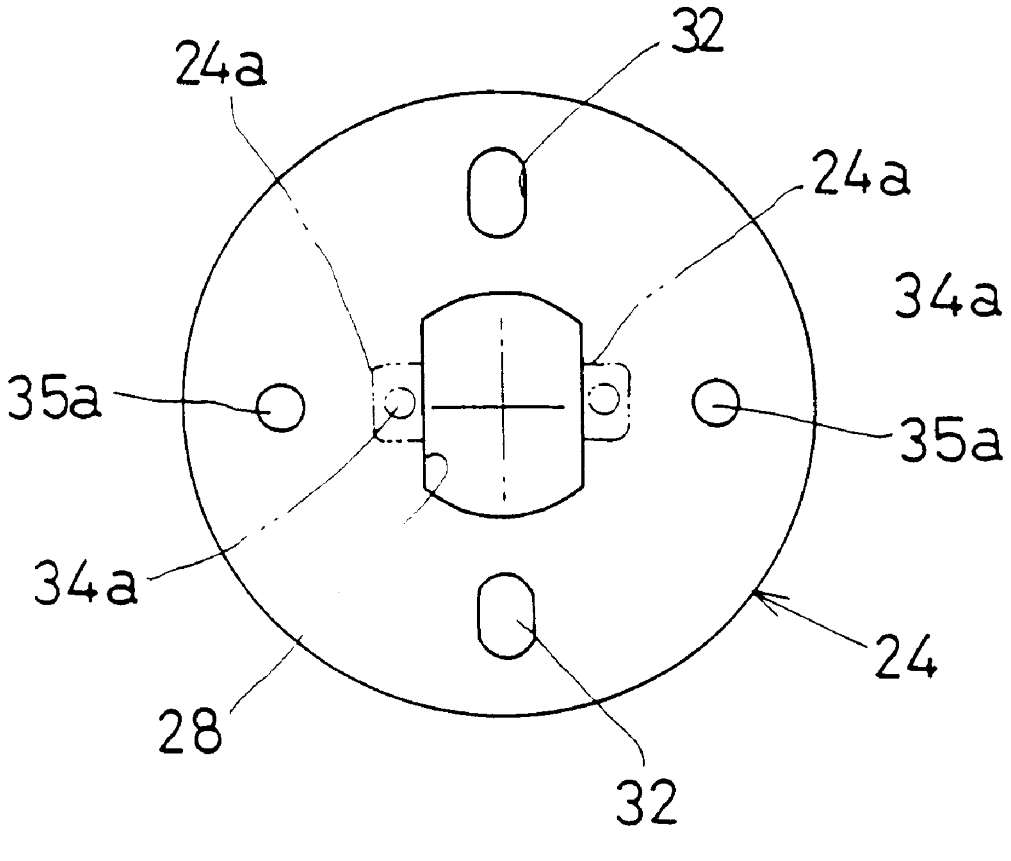
FIG. 17 is a front view of a holding plate.

The central part of the two holding plates 24, 24 forms a linkage fitting portion 28 for fitting in a playfree state in the linkage fitting portion 26 of the output shaft 10, and rotates integrally with the output shaft 10 (see FIG. 17).

Supposing the carrier 15 to be the driving side, the output shaft 10 may be called the driven side.

Further, as shown also in FIG. 16, on the side surface of the outside (left side in the drawing) of the carrier 15, to clear the locked state of the lock plates 21, 21, at opposite positions across the core, nearly triangular cam holes 29, 29 having inclined inner walls outward in the radial direction are formed, and pins 30, 30 of the lock plates 21, 21 are inserted in the cam holes 29, 29, and therefore when the carrier 15 is rotated in the driving direction, the inner walls of the cam holes 29, 29 abut against the pins 30, 30, and manipulate and move them from the lock position side of the lock plates 21, 21 to the inside unlocking position side. Therefore, an unlocking mechanism is formed by the cam hole 29 and pin 30.

Figure 14:
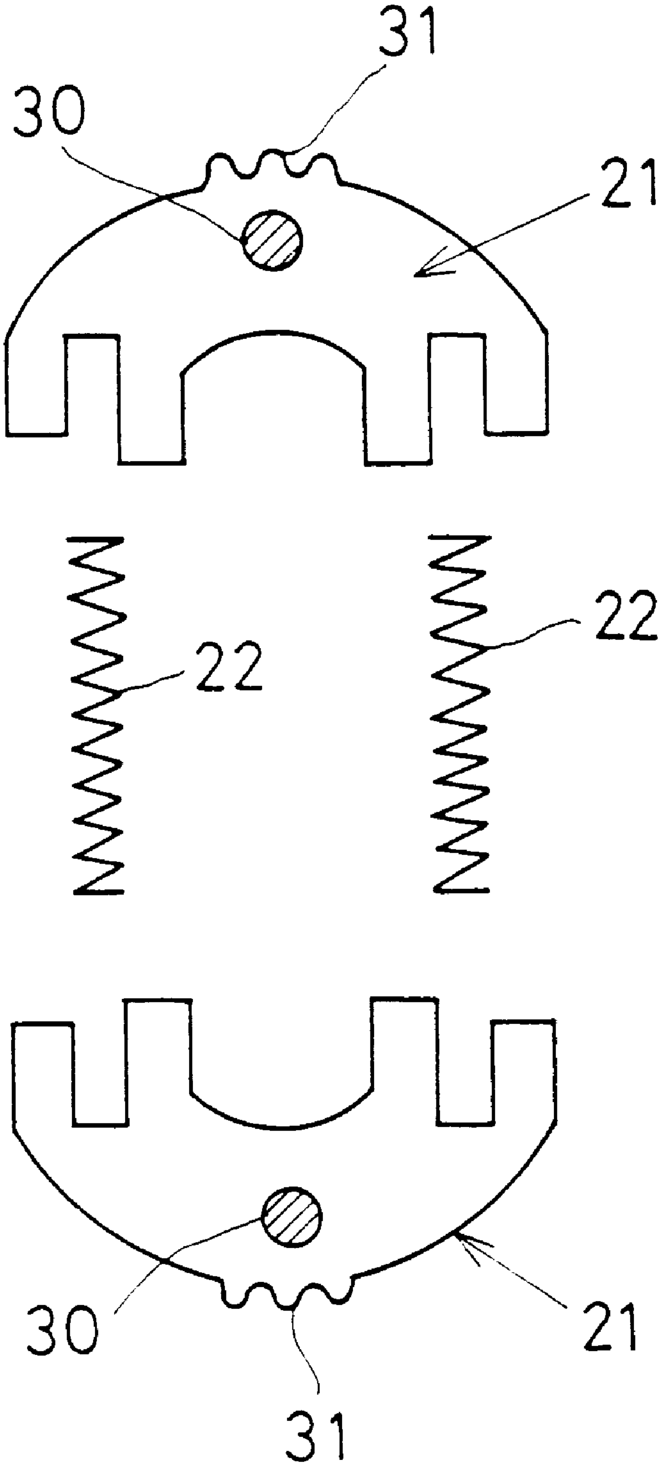
FIG. 14 is a front view of a lock plate.
Figure 15:
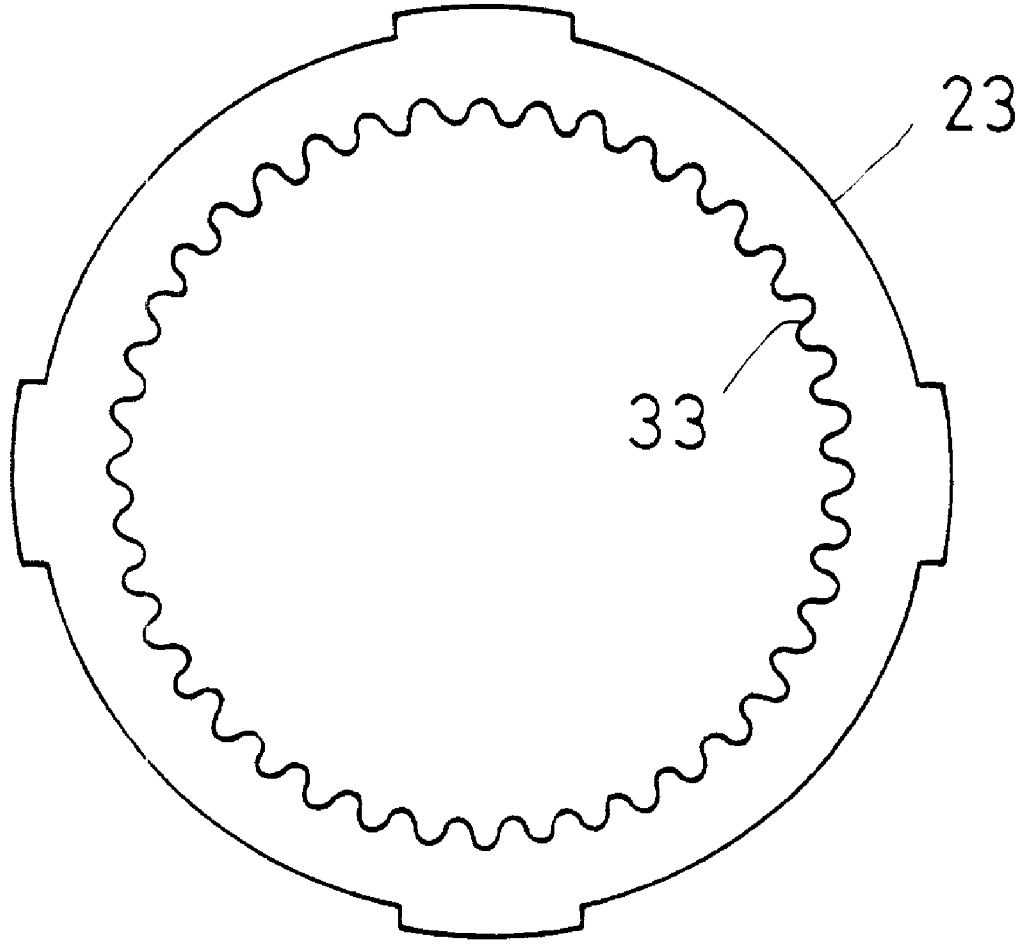
FIG. 15 is a front view of a fixed internal tooth ring.

As shown also in FIG. 14, on the outer circumference of the lock plates 21, 21, three lock pawls 31 are formed, and at the inside positions of the positions of the lock pawls 31, pins 30, 30 are planted and fixed in the intermediate portion of the three lock pawls 31, and when the pins 30, 30 are held in oval guide holes 32, 32 (see FIG. 17) in the radial direction of the holding plates 24, 24, they are held movably inward and out-ward in the radial direction, and one end portions of the pins 30, 30 are extended up to the cam holes 29, 29 of the carrier 15, and fitted in. The lock pawl 31 is not limited in the number of teeth as far as it can be engaged or disengaged by the move of the lock plate 21 in the radial direction.

When the lock plates 21, 21 are moved to the lock position side set at the outside in the radial direction by the thrusting force of the spring members 22, 22, the lock pawls 31 on the outer circumference are engaged with the gear 33 (see FIG. 15) formed on the inner circumference of the fixed inner tooth ring 23, so that the rotation of the lock plates 21, 21 is locked. Therefore, a locking mechanism is formed by the lock pawl 31 and gear 33.

FIG. 17 shows the holding plates 24, 24, and since the two holding plates 24 are nearly identical in structure, only one is shown.

The holding plate 24 forms a linkage fitting portion 28 rotating integrally by fitting without play to the linkage fitting portion 23 of the output shaft 10, at its core, and forms oval guide holes 32, 32 for guiding the sliding of the pins 30, 30 inward and outward in the radial direction, at positions opposite to the pins 30, 30 of the lock plates 21, 21.

Therefore, the pins 30, 30 of the lock plates 21, 21 are inserted from right and left into the guide holes 32, 32 of the two holding plates 24, 24, and the lock plates 21, 21 are held slidably between the lock position outside of the radial direction, and the unlock position at the inside (the core side).

The lock plates 21, 21 may be also held by either one of the right and left holding plates 24, but when held by the two holding plates 24, 24 as mentioned above, the components can be assembled into one unit including the lock device 20 and lock operation mechanism 25, so that assembling may be easier.

Figure 18:
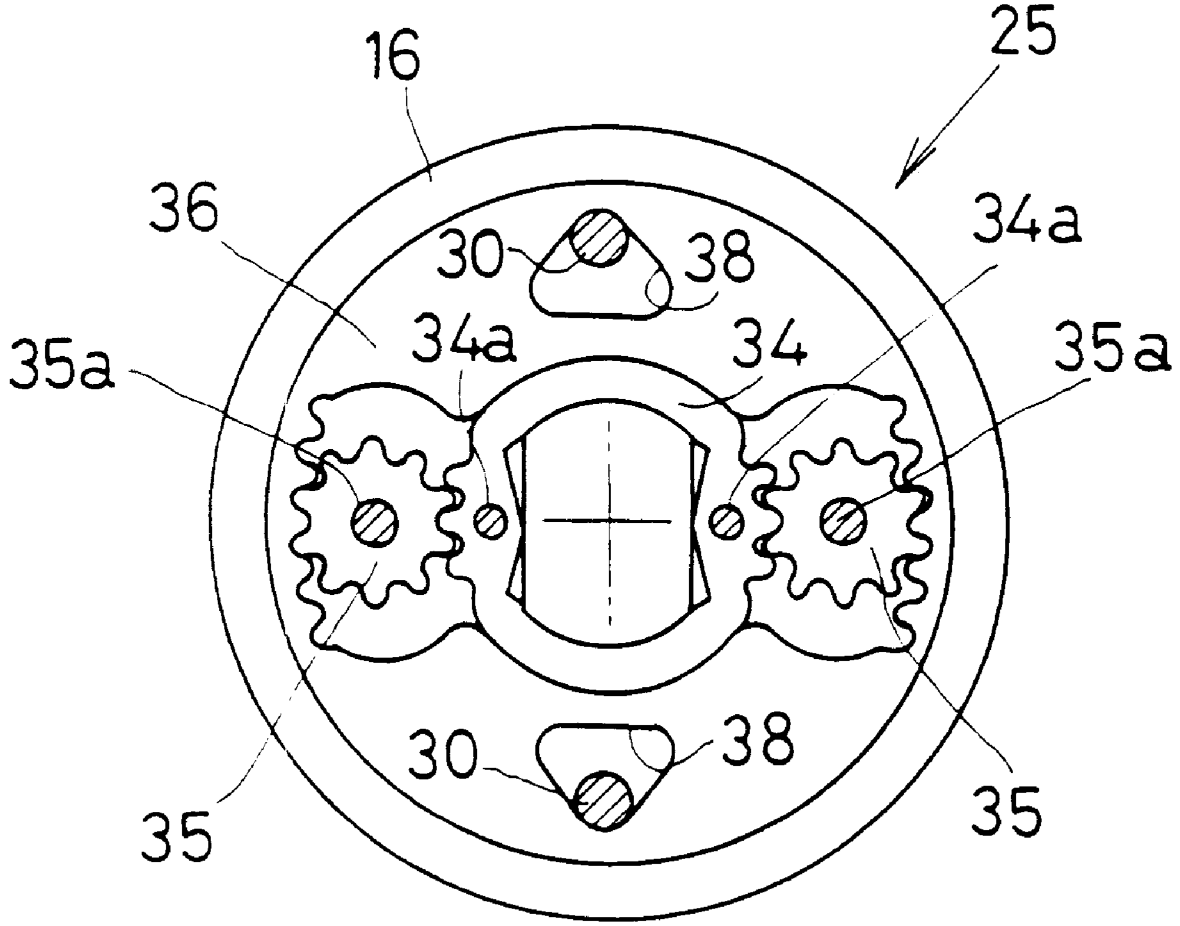
FIG. 18 is a front view of a lock operation mechanism.

FIG. 18 shows the lock operation mechanism 25, and this mechanism 25 is a planetary gear differential mechanism composed of a sun gear 34 forming gears at two opposite positions on both sides of the core, two planetary gears 35, 35 to be engaged with these gears, and an internal gear 36 forming part of gears engaged with the planetary gears 35, 35 as internal teeth on the outer circumference.

The both ends of support shafts **35*a*, 35*a* of the planetary gears 35, 35 are fitted to the holding plates 24, 24, so that the holding plates 24, 24 may be used as carriers, and by fitting the support shafts 35*a*, 35*a* to the holding plates 24, 24, the lock device 20 and lock operation mechanism 25** may be assembled into one unit.

At positions corresponding to the pins 30, 30 of the lock plates 21, 21 of the internal gear 36, nearly triangular cam holes 38, 38 having slopes outward in the radial direction are formed, and the pins 30, 30 are inserted.

The cam holes 38, 38 are set and formed in a size for moving and operating the lock plates 21, 21 from the unlocking position to the locking position through the pins 30, 30, by the moving stroke (amount of rotation) of the internal gear 36 side, when the sun gear 34 and internal gear 36 are moved by a uniform number of gears, by the moving stroke of the planetary gears 35, 35 rotating by the portion of play angle θ in the normal or reverse rotating direction from the neutral position. The shape of the cam holes 38, 38 may be also formed in a triangle in a reverse direction of the shown case.

The sun gear 34 is coupled with the carrier 15 of the motor shaft 11 side by the two pins **34*a*, 34*a*, and therefore at the positions corresponding to the pins 34*a*, 34*a* of the holding plate 24 (corresponding to the inside) positioned between the sun gear 34 and carrier 15, clearances 24*a*, 24*a* (see virtual line in FIG. 17) are formed so as to allow rotation of the pins 34*a*, 34*a*** by the play angle θ.

Moreover, in the central part of the sun gear 34, that is, in the inserted portion of the output shaft 10, a shape corresponding to the linkage fitting portion 27 of the carrier 15 is formed so as to allow the output shaft 10 to rotate by the play angle θ.

In the thus constituted lock device 20 of the output shaft 10, the operation is described below.

Figure 12:
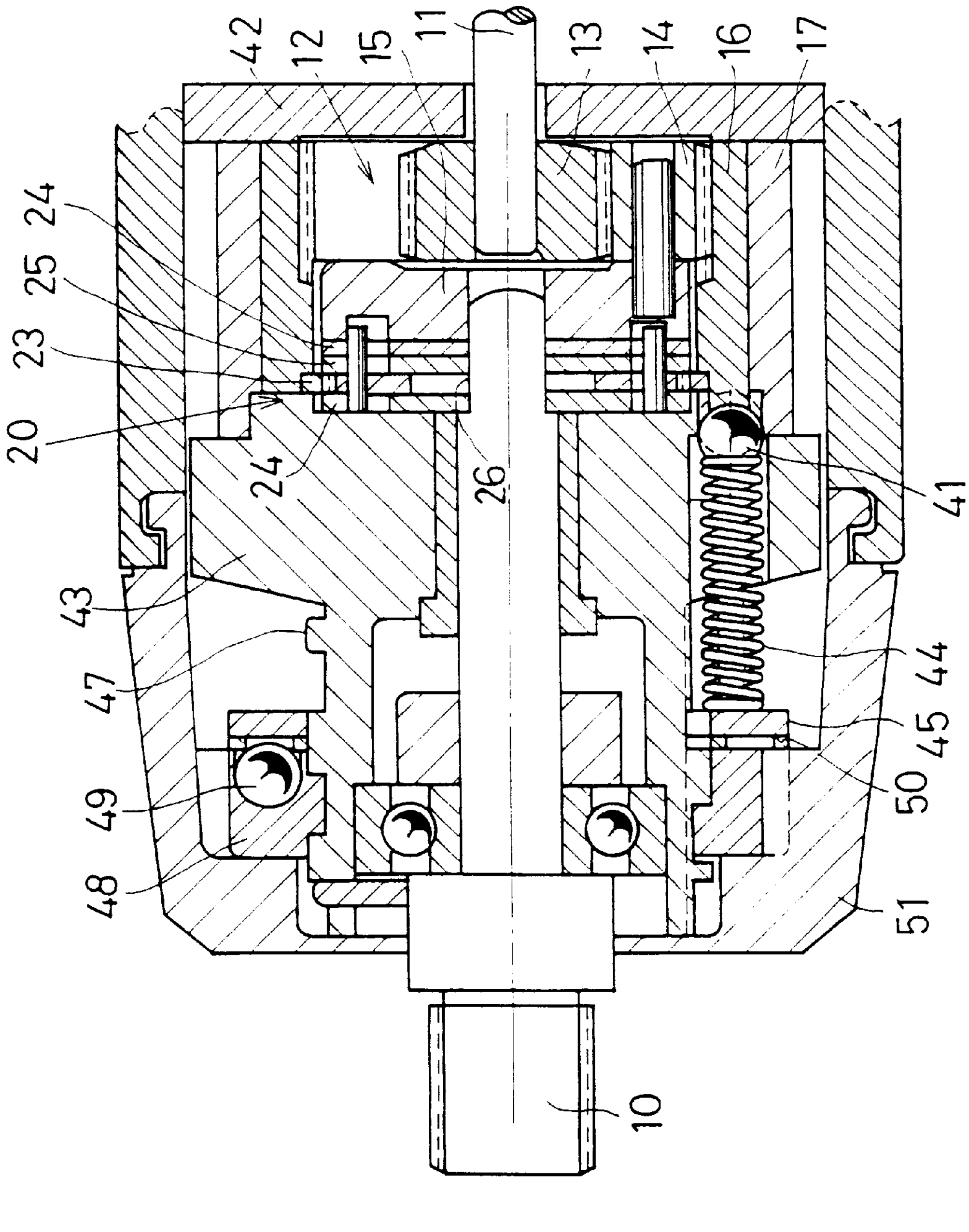
FIG. 12 is a sectional view of a lock device of output shaft in a second embodiment.
Figure 13:
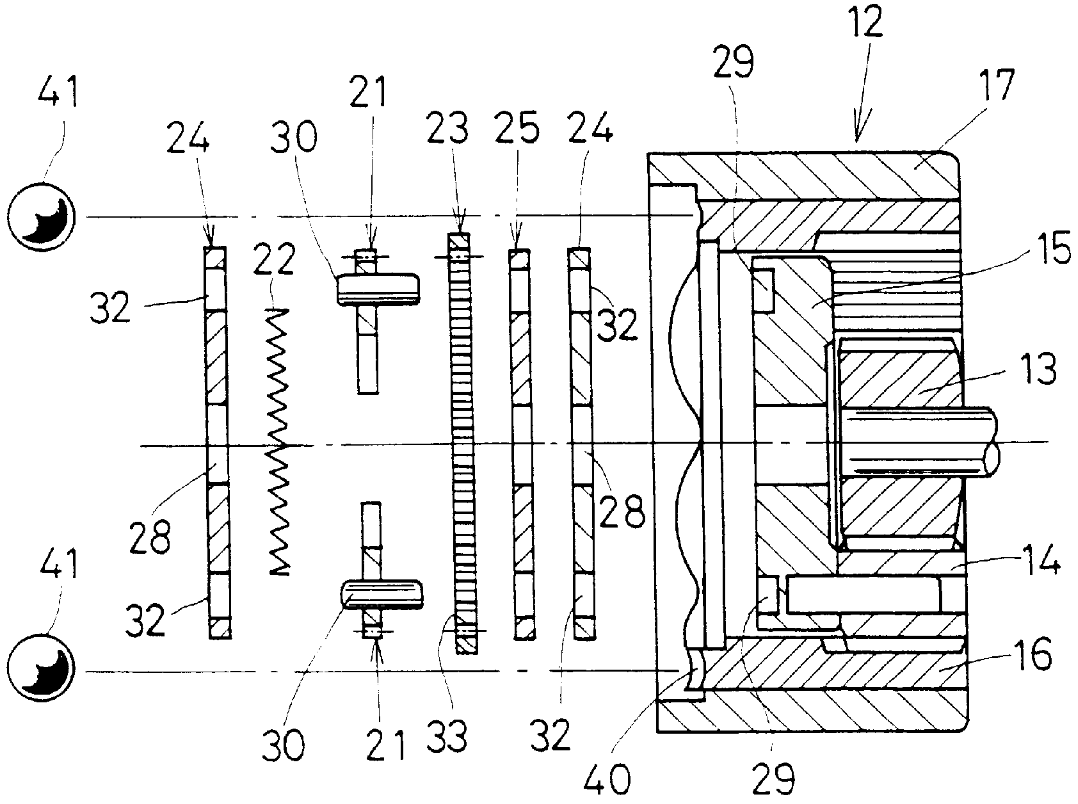
FIG. 13 is a partial exploded view of the lock device portion.
Figure 19:
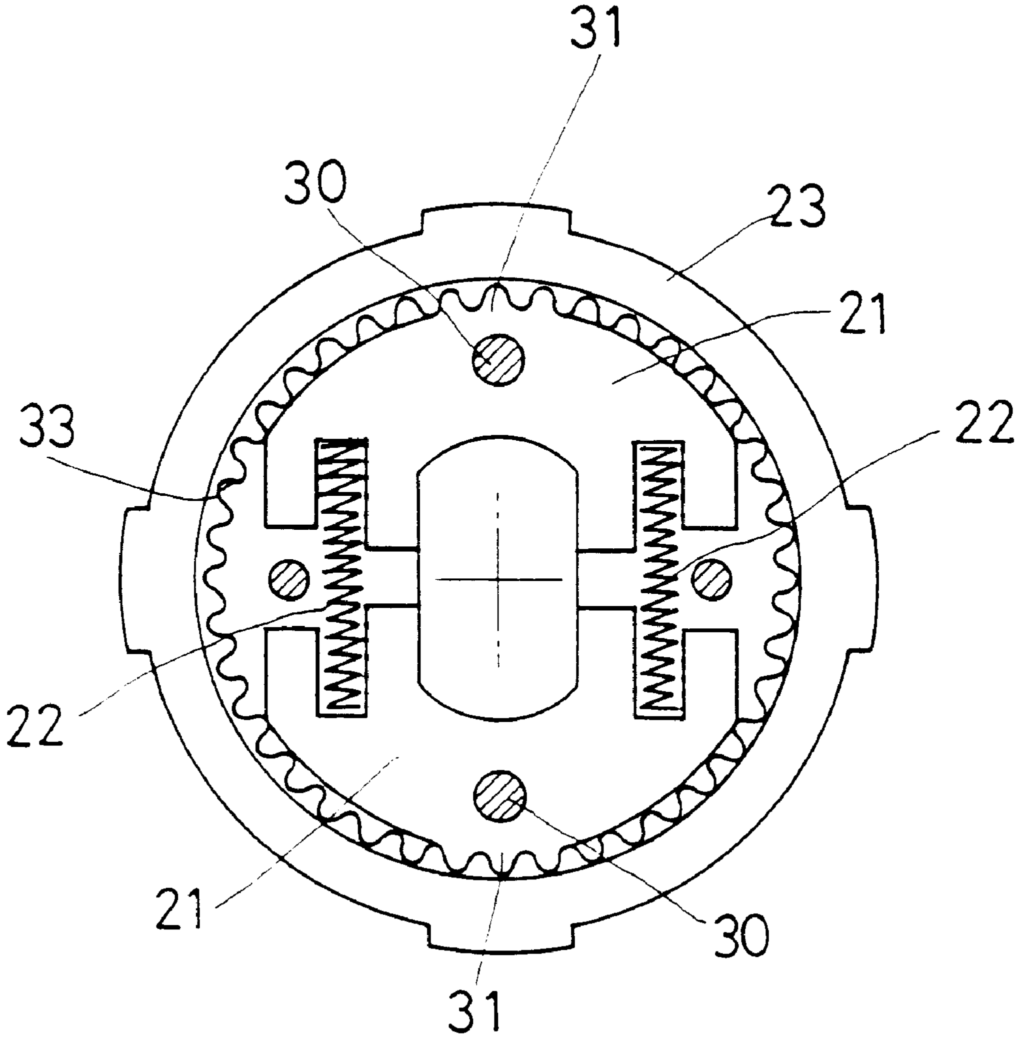
FIG. 19 is a front view showing a locked state of the lock device.

In FIG. 12, FIG. 18, and FIG. 19, the motor shaft 11 is stopped, and the positions of the pins 30, 30 of the lock plates 21, 21 and the cam holes 29, 29 of the carrier 15 are located in the state so that the pin 30 may be disposed in the upper part of the center of the cam hole 29 shown in FIG. 16, and the lock plates 21, 21 are thrust by the spring members 22, 22 to the outside in the radial direction, so that the lock paws 31 of the lock plates 21, 21 are engaged with the gear 33 of the fixed internal tooth ring 23 defined of rotation to be in locked state.

Therefore, in this state, when rotation is applied from the output shaft 10 side, for example, in normal or reverse direction by hand, since there is no play angle θ against the holding plate 24, the torque of the output shaft 10 is received by this holding plate 24, and the torque is transmitted to the lock plates 21, 21 through the guide holes 32, 32 of the holding plate 24, and the pin 30 of the lock plates 21, 21.

However, since the lock pawls 31 of the lock plates 21, 21 are engaged with the gear 33 of the fixed internal tooth ring 23 fixed in the internal gear 16 defined of rotation by the elasticity of the spring 44 as mentioned above, rotation is prohibited.

Hence, the output shaft 10 is in a locked state, and its hand turning is prevented.

In this way, when driving the output shaft 10 in a locked state, the motor is driven in the locked state, and the motor shaft 11 is rotated in a specified driving direction, so that the locked state is automatically cleared.

Figure 20:
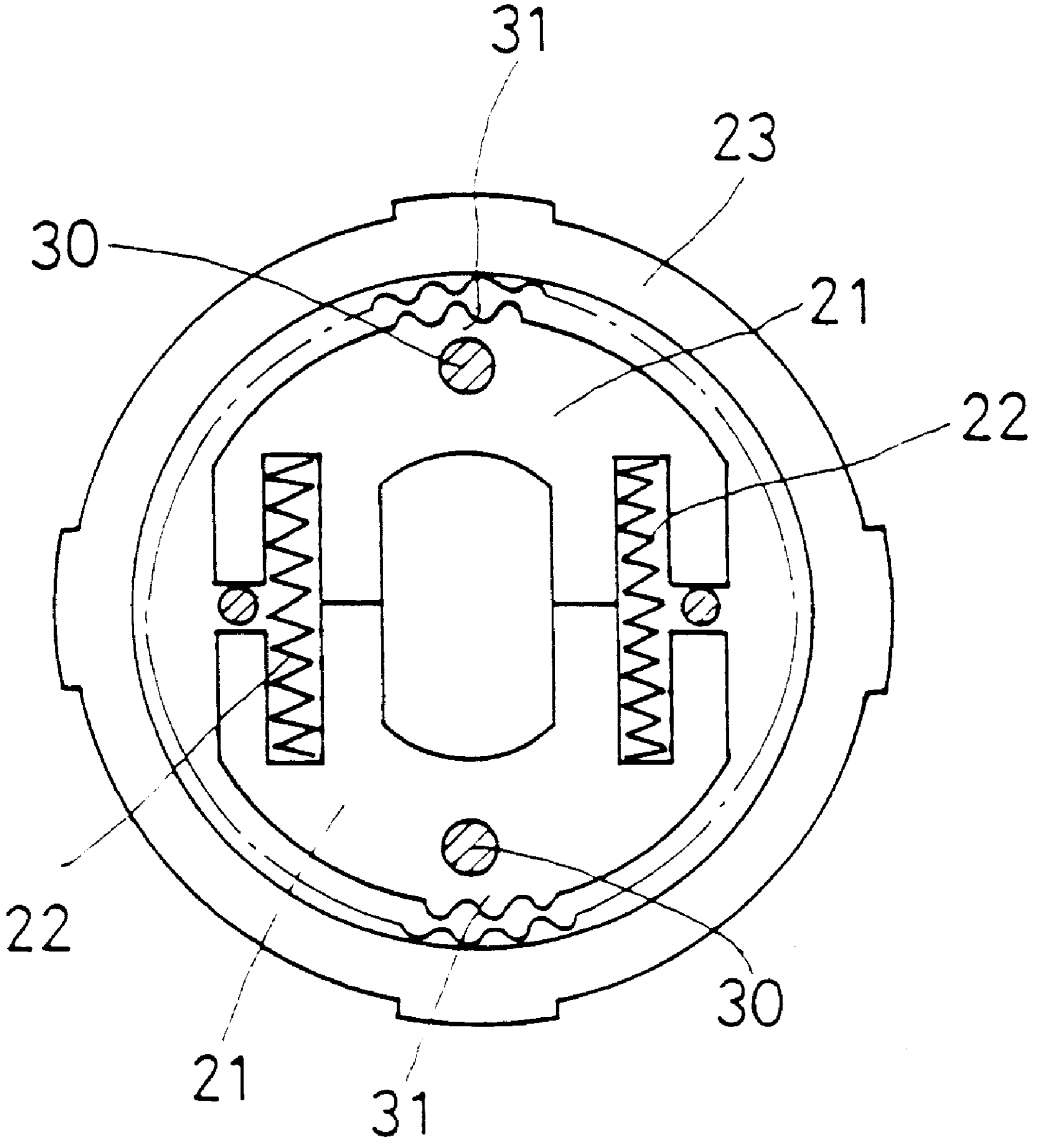
FIG. 20 is a front view showing an unlocked state of the lock device.

As shown in FIG. 20, the rotation of the motor shaft 11 is reduced by the planetary gear mechanism 12, and is delivered from the carrier 15, but since there is a play angle θ between the linkage fitting portions 27 and 26 of the carrier 15 and output shaft 10, after the carrier 15 rotates for the portion of this play angle θ, the torque is transmitted to the output shaft 10.

While the carrier 15 rotates for a portion of the play angle θ, the inclined inner walls of the cam holes 29, 29 of the carrier 15 transfer the pins 30, 30 of the lock plates 21, 21 to the unlocking position side at the inside in the radial direction. By the action of the cam holes 29, 29, the lock plates 21, 21 transfer to the unlocking position at the core side by overcoming the spring members 22, 22, and the lock pawl 31 is dislocated from the gear 33 of the fixed inner tooth ring 23 to permit rotation of the output shaft 10, so as to be cleared from the locked state.

As the rotation of the output shaft 10 is continued, the pins 30, 30 are defined in the unlocking position by the cam holes 29, 29, and the unlocked state of the lock plates 21, 21 is maintained, and the output shaft 10 is rotated by the driving force of the motor shaft 11. Therefore, work by the tool is enabled.

When the rotation of the motor shaft is stopped by stopping the motor in the driving state, as the torque of the motor shaft 11 declines, when the output shaft 10 side inertia increases, the rotation of the output shaft 10 precedes the carrier 15, and by this preceding, their mutual play angle θ retrogrades, and the definition of the pins 30, 30 of the lock plates 21, 21 by the cam holes 29, 29 of the carrier 15 is cleared, and the lock plates 21, 21 are transferred to the outward lock position by the thrusting force of the spring members 22, 22. As a result, the lock pawls 31 of the lock plates 21, 21 are engaged with the gear 33 of the fixed internal tooth ring 23 defined of the rotation, so as to be set in locked state.

Therefore, when the motor shaft 11 stops, the output shaft 10 is automatically locked, and the rotation is stopped immediately, and rotation by inertia does not occur, and safety is enhanced.

This automatic locking action produces a secure action as the rotation is caused in the output shaft 10 by inertia. However, when the load of the planetary gear mechanism 12 of the motor shaft 11 is high, and when driven at low speed, the rotation by inertia may not occur.

The lock operation mechanism 25 can apply lock action by hand, regardless of the automatic locking action.

That is, when lock does not act on the output shaft 10, the pins 30,30 of the lock plates 21, 21 are stopped in the state being defined at the unlocking position on the inclined inner walls of the cam holes 29, 29 of the carrier 15 (see virtual line of pins 30, 30 in FIG. 16).

Figure 21:
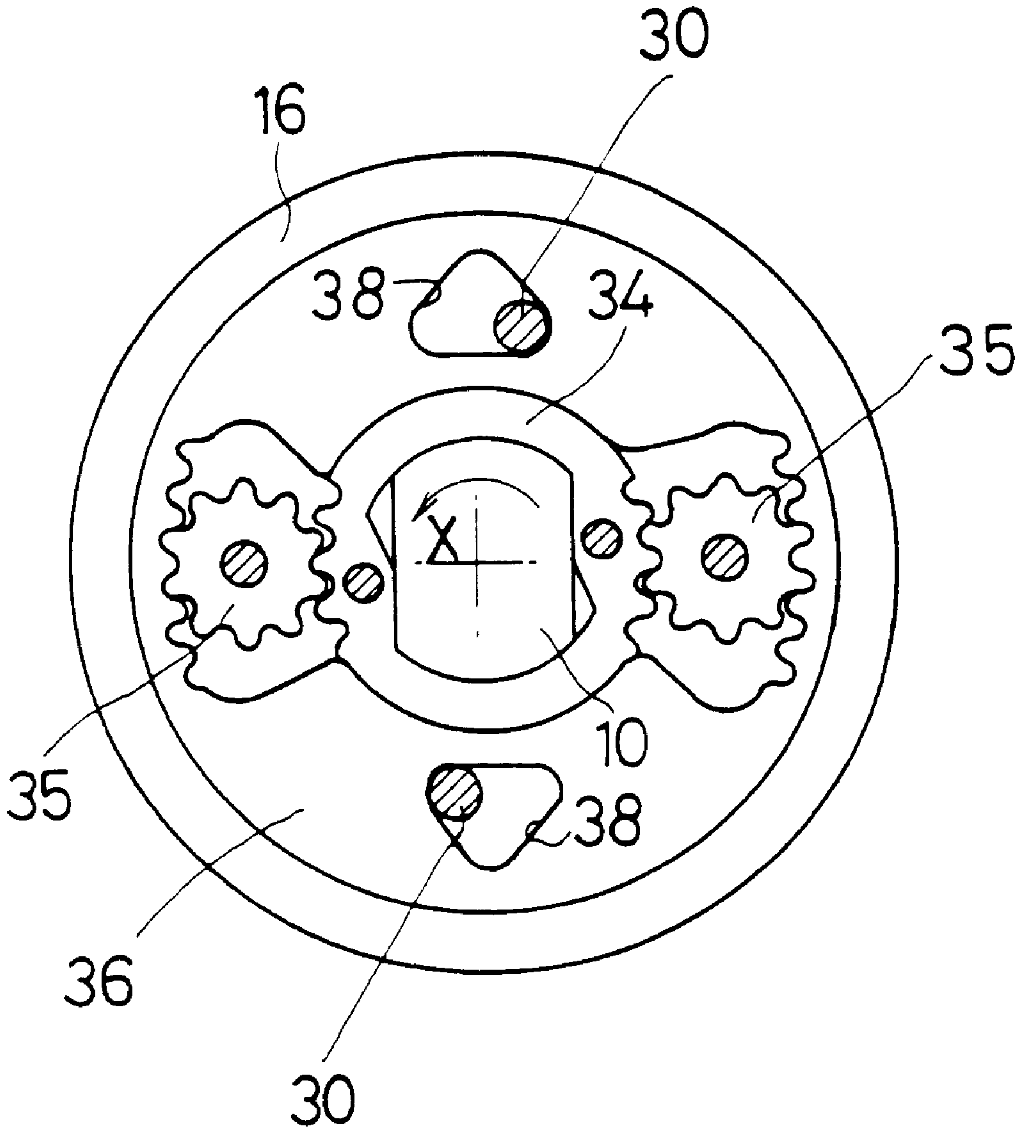
FIG. 21 is a sectional view showing a state of use of the lock operation mechanism.

FIG. 21 shows the stopped state without action of lock, and hence the pins 30, 30 of the lock plates 21, 21 are positioned at the unlocking position (inside in the radial direction).

By revolution of the planetary gears 35, 35, if the loads of the sun gear 34 and internal gear 36 are nearly uniform, they both rotate in the opposite directions (the sun gear 34 rotates clockwise in the direction so that the pin 30 indicated by virtual line in FIG. 16 departs from the cam hole 29 of the carrier 15, while the internal gear 36 rotates counterclockwise in the direction so that the pin 30 in FIG. 21 pulls the cam hole 34).

If the load is higher in either the sun gear 34 or internal gear 36, the lighter load side is increased and turned.

Therefore, when the sun gear 34 rotates clockwise, since the carrier 15 is rotated to the central position by departing the pins 30, 30 of the lock plates 21, 21 from the defining position of the cam holes 29, 29 through the pins 34, 34*a*, so that the definition of the pins 30, 30 is cleared, and the lock plates 21, 21 can be moved to the lock position, so that locking action is applied.

When the internal gear 36 rotates counterclockwise, the pins 30, 30 of the lock plates 21, 21 are pulled by the cam holes 38, 38, and they can be rotated to the central position by departing from the defining positions of the cam holes 29, 29 of the carrier 15, and the definition of the pins 30, 30 is cleared, and the lock plates 21, 21 can be moved to the locking position, so that locking action is applied.

In this way, locking action is applied by rotating the output shaft 10 side in the inertial direction by the portion of the play angle θ.

In actual operation, if the inertial direction of the output shaft 10 is unknown to the operator, by rotating the output shaft 10 in normal or reverse direction by the portion of the play angle θ, it is locked in either rotating side, so that there is no confusion in operation.

Besides, since the rotating amount of the output shaft 10 increased by the planetary gear differential mechanism for composing the lock operation mechanism 25, the rotating amount of the output shaft 10 for locking operation may be very slight.

The planetary gear differential mechanism of the lock operation mechanism 25 is composed in the radial direction, but an equivalent action is obtained if composed of the differential direction in the thrust direction.

EMBODIMENT 3

FIG. 22 to FIG. 30 show a third embodiment, and constituent elements having the same function as in the first and second embodiments are identified with same reference numerals and a detailed description thereof is omitted.

Figure 22:
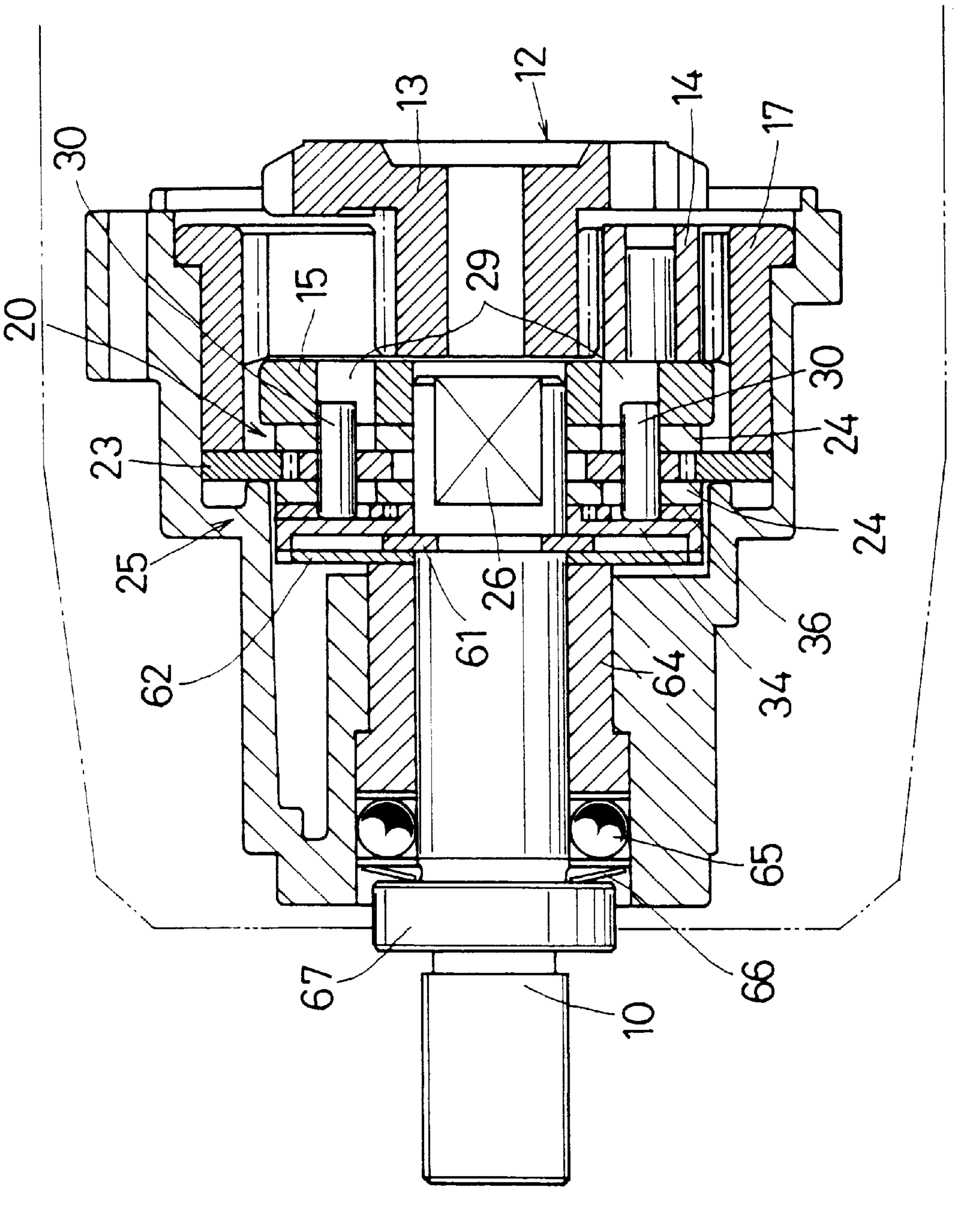
FIG. 22 is a sectional view of a lock device of output shaft in a third embodiment.
Figure 23:
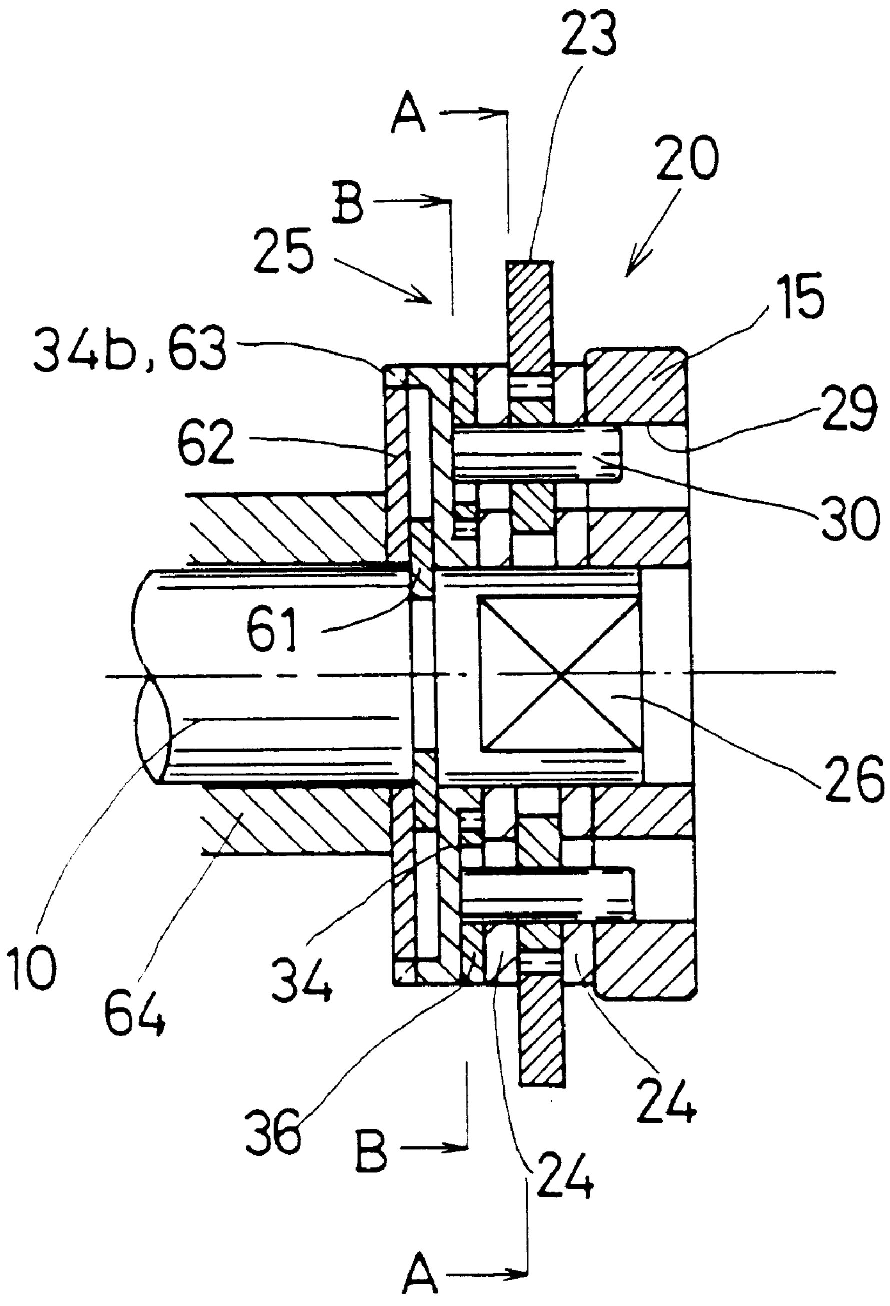
FIG. 23 is a sectional view of locking mechanism and unlocking mechanism portions.
Figure 24:
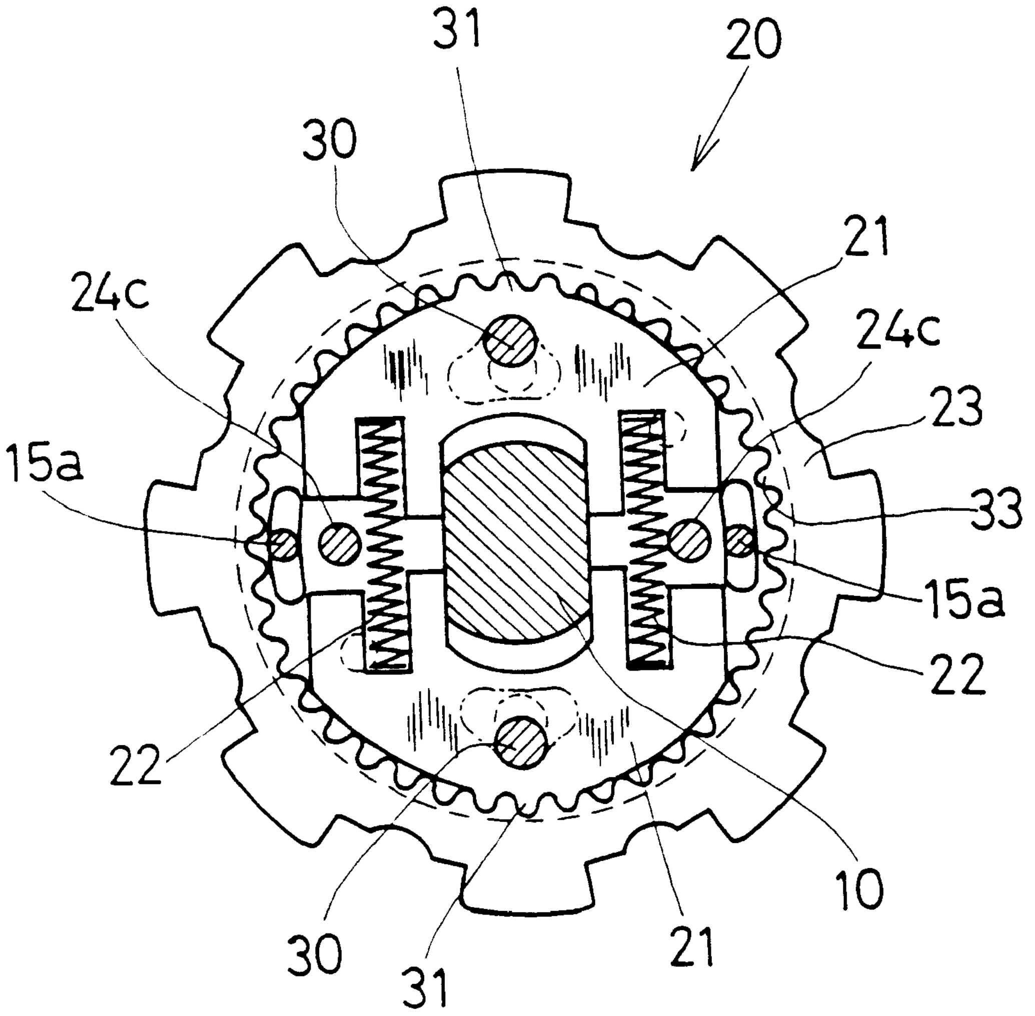
FIG. 24 is a front view showing a locked state of the lock device in line A—A view in FIG. 23.

This embodiment also relates to an example of applying the lock device of output shaft of the invention in an output shaft of a hand-held power tool, and as shown in FIG. 22, FIG. 23, and FIG. 24, the lock device 20 for locking the output shaft 10 is composed of the carrier 15, two lock plates 21, 21 divided in the radial direction, spring members 22, 22 in a coil spring form for thrusting the lock plates 21, 21 to the lock position out-ward in the radial direction, a fixed inner tooth ring 23 coupled and fixed to the fixed ring 17, and two holding plates 24, 24 for holding the lock plates 21, 21 at the mutually confronting inner sides, and this lock device 20 also comprises a lock operation mechanism 25 for locking by releasing manipulation of unlocking operation. In this embodiment, the location of the lock operation mechanism 25 is at the outside (left side in FIG. 22) of the lock device 20.

Figure 26:
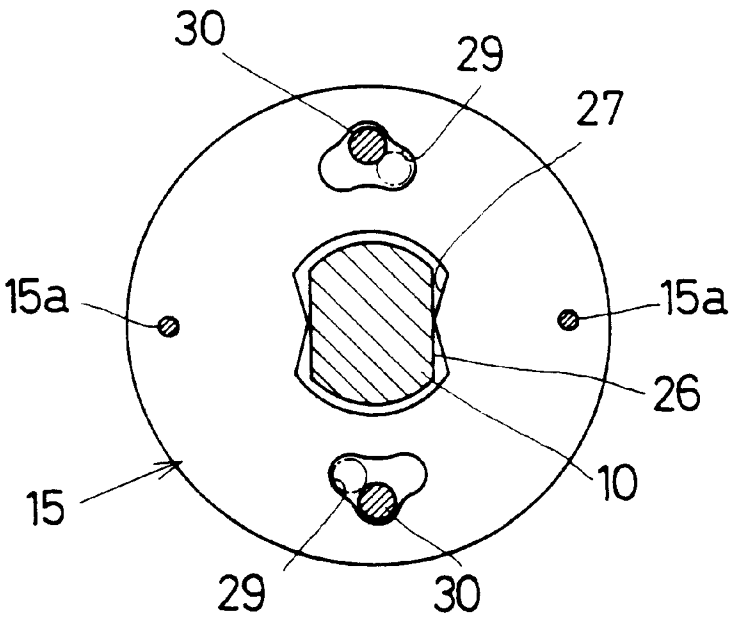
FIG. 26 is a front view of a carrier.

As shown in FIG. 26, the core portion of the carrier 15 and the inner end portion of the output shaft 10 are fitted mutually and connected transmittably, by forming a play angle for not transmitting for a specified angle θ in the normal and reverse rotating directions mutually from the neutral position, in their linkage fitting portions 26, 27 (see the second embodiment in FIG. 16).

The carrier 15 and an internal gear 36 described later are coupled so as to cooperate by a coupling pin 15*a*.

Further, on the side surface of the outside (left side in FIG. 22, FIG. 23) of the carrier 15, nearly triangular cam holes 29, 29 having inclined inner walls outward in the radial direction are formed, and pins 30, 30 of the lock plates 21, 21 are inserted in the cam holes 29, 29, and therefore when the carrier 15 is rotated in the driving direction, the inner walls of the cam holes 29, 29 abut against the pins 30, 30, and manipulate and move them from the lock position side of the lock plates 21, 21 to the inside unlocking position side. Therefore, an unlocking mechanism is formed by the cam hole 29 and pin 30.

Figure 25:
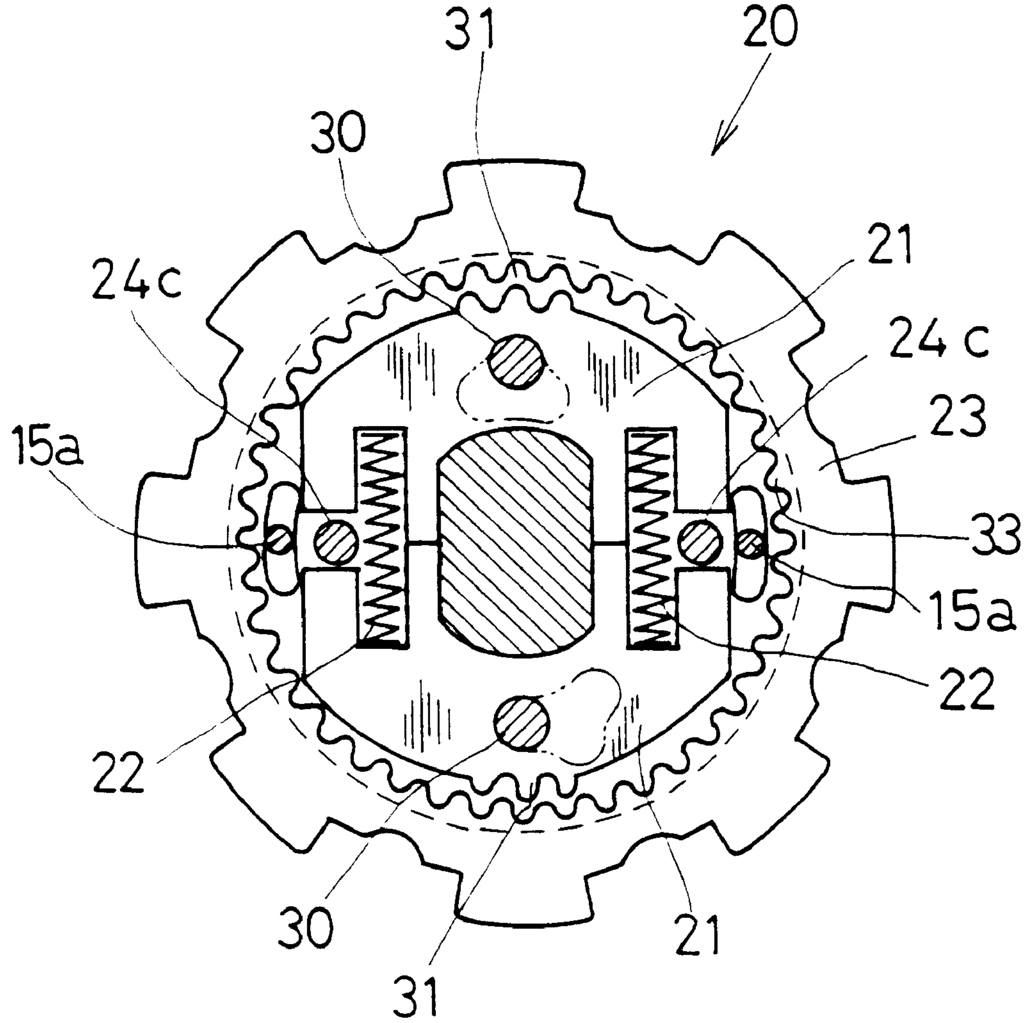
FIG. 25 is a front view showing an unlocked state of the lock device.

As shown also in FIG. 24 and FIG. 25, on the outer circumference of the lock plates 21, 21, three lock pawls 31 are formed, and at the inside positions of the positions of the lock pawls 31, pins 30, 30 are planted and fixed in the intermediate portion of the three lock pawls 31, and when the pins 30, 30 are held in guide holes 32, 32 of the holding plates (see FIG. 27), they are held movably inward and outward in the radial direction, and one end portions of the pins 30, 30 are extended up to the cam holes 29, 29 of the carrier 15, and fitted in.

When the lock plates 21, 21 are moved to the locking position side set outside in the radial direction by the thrusting force of the spring members 22, 22, the lock pawls 31 on the outer circumference are engaged with the gear 33 formed on the inner circumference of the fixed inner tooth ring 23, so that the rotation of the lock plates 21, 21 may be locked.

Figure 27:
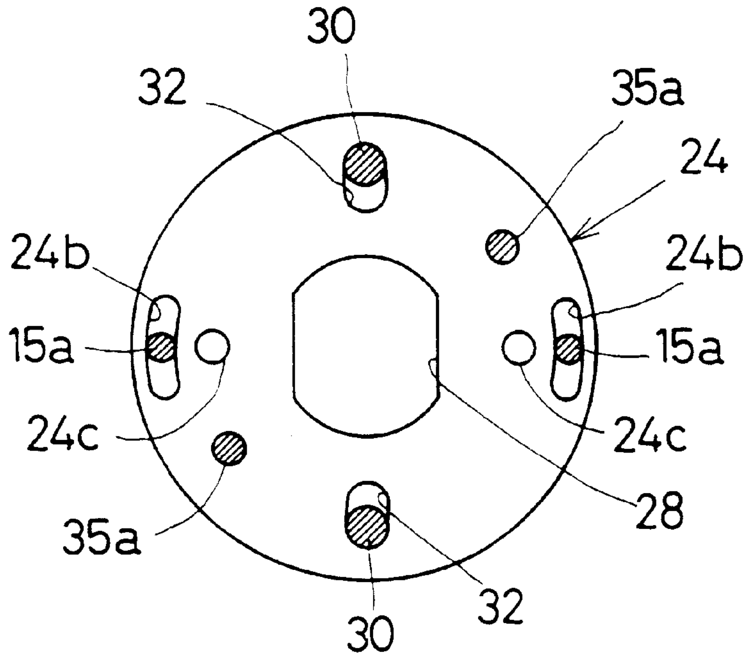
FIG. 27 is a front view of a holding plate.

FIG. 27 shows the holding plates 24, 24, and the two holding plates 24 are nearly identical in shape, and the holding plate 24 illustrated at the left side in FIG. 22 and FIG. 23 is shown. However, at the right side holding plate 24, the support shaft 35*a* of the planetary gear 35 is not provided. In the drawing, reference numeral 24*b* denotes a clearance of the coupling pin 15, and 24*c* is a coupling pin for coupling the right and left holding plates 24, 24.

The holding plate 24 forms a linkage fitting portion 28 rotating integrally by fitting without play to the linkage fitting portion 23 of the output shaft 10 at its core, and at the positions confronting the pins 30, 30 of the lock plates 21, 21, oval guide holes 32, 32 for guiding sliding of the pins 30, 30 inward and outward in the radial direction are formed.

Therefore, the pins 30, 30 of the lock plates 21, 21 are inserted from right and left into the guide holes 32, 32 of the two holding plates 24, 24, and the lock plates 21, 21 are held slidable between the lock position outside in the radial direction and the unlocking position at the inside (core side).

Figure 28:
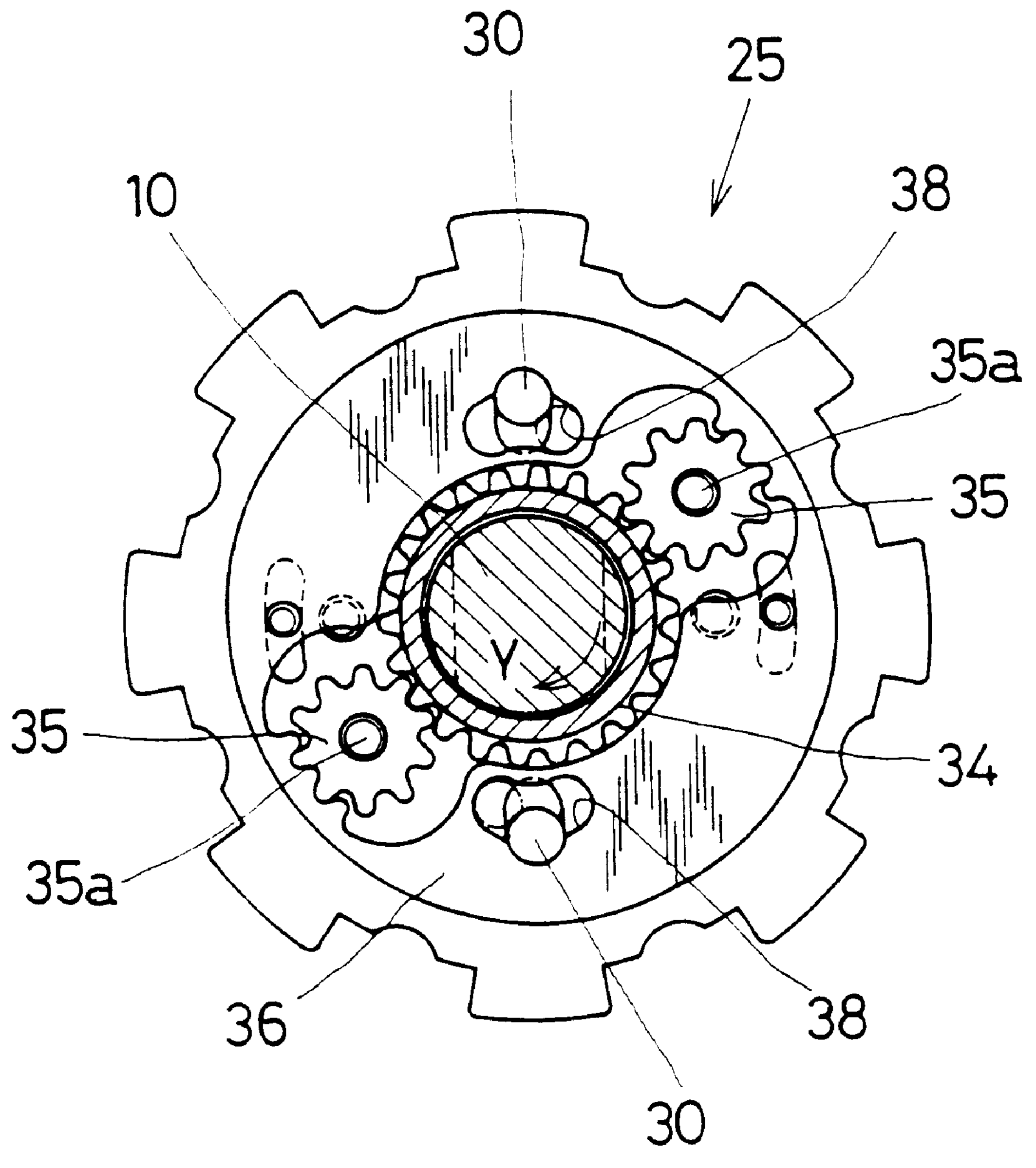
FIG. 28 is a front view of a lock operation mechanism in line B—B view in FIG. 23.

FIG. 28 shows the lock operation mechanism 25, and this mechanism 25 is disposed at the outside (left side in FIG. 22, FIG. 23) of the lock device. The mechanism 25 is a planetary gear mechanism composed of a sun gear 34 forming gears on the whole circumference, two planetary gears 35, 35 engaged with these gears, and an internal gear 36 forming part of the gears engaged with the planetary gears 35, 35 as internal teeth at the outer circumference.

The support shaft 35*a* of the planetary gears 35, 35 is attached to the holding plate 24 (left side in FIG. 22, FIG. 23; see FIG. 27), so that the holding plate 24 is used as a carrier.

At the positions corresponding to the pins 30, 30 of the lock plates 21, 21 of the internal gear 36, nearly triangular cam holes 38, 38 having slopes outward in the radial direction are formed, and the pins 30, 30 are inserted.

The cam holes 38, 38 are formed nearly in the same shape as the cam holes 29, 29 formed in the carrier 15.

Figure 29:
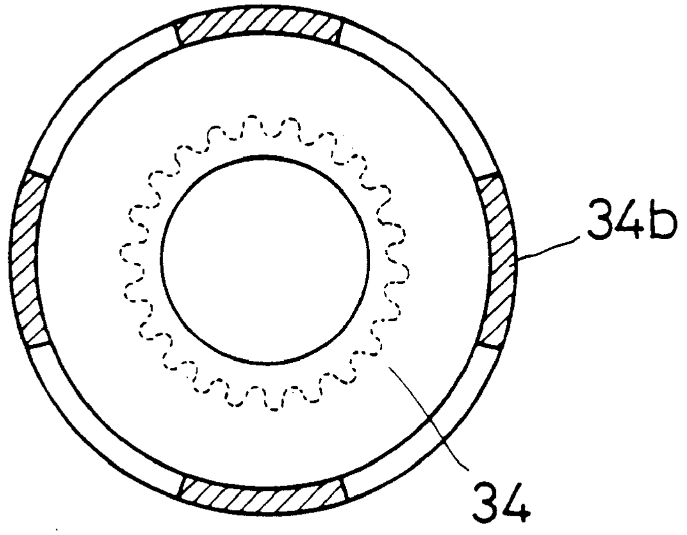
FIG. 29 is a front view of a sun gear in a lock operation mechanism.

As shown in FIG. 22, FIG. 23, and FIG. 29, the sun gear 34 is freely fitted to the output shaft 10. In the sun gear 34, the outside of the gear portion is a disc, and stopping pawls 34*b* are formed at the outside of the outer peripheral edge. A C-ring 61 is fitted to the output shaft 10 at the outside of the sun gear.

At the outside of the C-ring 61, the inner side of a circular brake disc 62 is fitted to the output shaft 10 so as to confront, and it is freely fitted to the output shaft 10.

Figure 30:
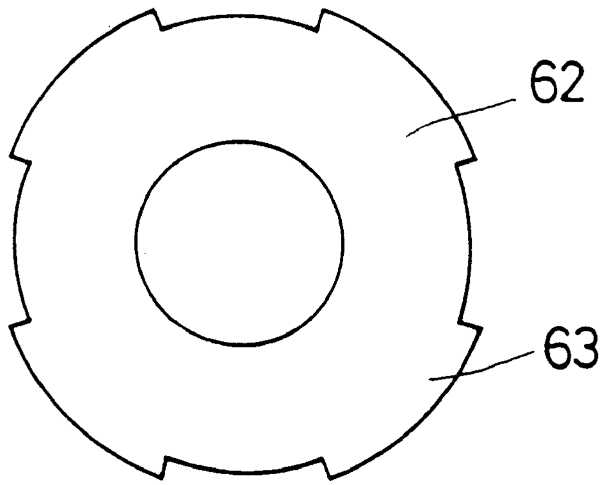
FIG. 30 is a front view of a plate disc.

As shown in FIG. 30, on the outer circumference of the brake disc 62, an engaging pawl 63 is formed corresponding to stopping pawls 34*b* of the disc of the sun gear 34, and by engaging the pawls 34*b*, 63 mutually, when a brake is applied to the plate disc 62, a brake is also applied to the sun gear 34, so that the rotation is stopped or fixed.

The outer side of the brake disc 62 abuts against the inner side of a support cylinder 64 for supporting the output shaft 10, and as the brake disc 62 is held between the inner end of the support cylinder 64 and the C-ring 61, a brake is applied to the brake disc 62.

As shown in FIG. 22, to achieve such holding action, a coned disc spring 66 is interposed between the front end side of the support cylinder 64 and a flange 67 of the output shaft 10 through a thrust bearing 65, and this coned disc spring 66 provides the output shaft 10 with an outward (leftward in FIG. 22) thrusting force.

Accordingly, since the C-ring 61 on the output shaft 10 receives an outward thrusting force same as the output shaft 10, and the C-ring 61 pushes the brake disc 62 to the inner end side of the support cylinder 64, thereby actuating the brake.

While the output shaft 10 is in a working state by mounting a tool, since the output shaft 10 receives a reaction in the inward direction (right-ward in FIG. 22) by the work, the pressure of the C-ring 61 is cleared, and the brake will not be applied on the brake disc 62. Hence, the rotation of the sun gear 34 is permitted, so that the rotation of the output shaft 10 being driven will not be impeded.

In the thus constituted output shaft 10, the operation of the lock device 20 is similar to that in the second embodiment, and a detailed description thereof is omitted, but the locked state is as shown in FIG. 24.

That is, the positions of the pins 30, 30 of the lock plates 21, 21, and cam holes 29, 29 of the carrier 15 are the same as in FIG. 16 relating to the second embodiment, and the pin 30 is disposed in the upper part of the center of the cam hole 29, and the lock plates 21, 21 are thrust outside in the radial direction by the spring members 22, 22, and hence the lock pawls 31 of the lock plates 21, 21 are engaged with the gear 33 of the fixed inner tooth ring 23, so as to be in a locked state.

Therefore, the output shaft 10 is in a locked state, and hand turning is prevented.

Thus, when driving the output shaft 10 in the locked state, the motor is driven in the locked state and the motor shaft is rotated in the specified driving direction, so that the locked state is cleared automatically.

This automatic clearing action of the located state is same as in the second embodiment, and a detailed description is omitted, but the unlocked state omitted is as shown in FIG. 25.

That is, the rotation of the motor shaft is delivered from the carrier 15, but since there is a play angle θ between the linkage fitting portions 27 and 26 of the carrier 15 and the output shaft 10, while the carrier 15 rotates for the portion of the play angle θ, the inclined inner walls of the cam holes 29, 29 of the carrier 15 transfer the pins 30, 30 of the lock plates 21, 21 to the unlocked position side inside in the radial direction. By the action of the cam holes 29, 29, the lock plates 21, 21 are moved to the core side unlocking position by overcoming the spring members 22, 22, and the lock pawl 31 is dislocated from the gear 33 of the fixed inner tooth ring 23, and the rotation of the output shaft 10 is permitted so as to be cleared from the locked state.

When the rotation of the output shaft 10 is continued, the pins 30, 30 are defined in the unlocking position by the cam holes 29, 29, and the unlocked state of the lock plates 21, 21 is maintained, and the output shaft 10 is rotated by the driving force of the carrier 15.

Incidentally, since the coned disc spring 66 is not compressed by the reaction of the operation, the brake disc 62 has no brake action. It is hence possible to operate the device by use of a tool.

To set in the locked state in FIG. 24 from the unlocked state in FIG. 25, driving of the motor shaft is stopped. This automatic locking action is same as in the second embodiment, and a detailed description thereof is omitted.

This lock operation mechanism 25 is capable of locking manually regardless of the above action of the automatic locking.

For example, when the lock of the lock device 20 does not act on the output shaft 10, as indicated by virtual line in FIG. 26, the pins 30, 30 of the lock plates 21, 21 are stopped in the state defined in the unlocking position on the inclined inner walls of the cam holes 29, 29 of the carrier 15, and also in the lock operation mechanism 25 shown in FIG. 28, the pins 30, 30 of the lock plates 21, 21 are stopped at the defined position of unlocking indicated by virtual line.

In FIG. 28, in this state, when the output shaft 10 is turned in the direction of arrow Y (clockwise) by hard, this rotation causes also to rotate the planetary gears 35, 35 of the lock operation mechanism 25 in the direction of Y through the holding plates 24, 25.

On the other hand, since the brake disc 62 is held between the C-ring 61 and the inner end of the support cylinder 64 by the thrusting force of the coned disc spring 66 to apply braking action, the sun gear 34 is in a fixed state.

Therefore, as mentioned above, when the planetary gears 35, 35 rotate in the direction of Y, they rotate or the sun gear 34, so that the internal gear 36 is accelerated by the revolution of the planetary gears 35, 35, thereby rotating in the direction of Y.

Thus, when the internal gear 36 rotates in the direction of Y with a rotational difference as being accelerated, the rotation is faster than the revolution of the planetary gears 35, 35 (same rotation of the holding plates 24, 24) by the portion of the rotational difference, and this rotation is faster than the pins 30, 30 of the lock plates 21, 21 rotating in cooperation with the rotation of the holding plates 24, 24, so that the internal gear 36 rotates in the direction of Y.

As a result, the pins 30, 30 are dislocated from the defining position of the cam holes 38, 38 of the internal gears 36, and the pins 30, 30 can be moved to the central position of the cam holes 38, 38.

Moreover, since the internal gear 36 is coupled with the carrier 15 through the coupling pins 15*a*, 15*a* (see FIG. 26), this carrier 15 also rotates in the direction of Y by the same amount as the internal gear 36, and the pins 30, 30 of the lock plates 21, 21 are dislocated from the defining positions of the cam holes 29, 29 of the carrier 15, so that the pins 30, 30 can be moved to the central position.

In this way, when the pins 30, 30 of the lock plates 21, 21 are moved to the middle from the defining positions of unlocking of the cam holes 29, 29 of the carrier 15, by the elastic force of the spring members 22, 22, the lock plates 21, 21 can move to the lock position outward in the radial direction, and the lock pawls 31 are engaged with the gear 33 of the fixed inner tooth ring 23 defined of rotation, thereby achieving the locked state.

In actual operation, if the rotating direction Y of the output shaft 10 is unknown to the operator, by rotating the output shaft 10 in normal or reverse direction, it is locked in either rotating side (the rotating direction of the lighter torque), so that there is no confusion in operation.

In the third embodiment, meanwhile, the torque limiter shown in FIG. 8 in the first embodiment is not provided, but it may be also provided herein.

What is claimed is:

1. An output shaft lock device comprising:

a driving shaft;

a driven shaft;

connecting means for connecting said driving shaft to said driven shaft to thereby form an output shaft, said connecting means forming a play angle in the rotating directions of said driving shaft and said driven shaft for not transmitting power therebetween;

a lock member disposed on said driven shaft;

locking means provided in said connecting means and adjacent said driven shaft for moving said lock member to a locked position on said driven shaft;

unlocking means provided in said connecting means and adjacent said driving shaft for moving said lock member to an unlocked position while said driving shaft is moved within said play angle, and by reverse rotation of said driving shaft relative to said driven shaft; and a planetary gear differential mechanism provided in said connecting means and comprising an internal gear, a planetary gear, a sun gear, and a carrier supporting said planetary gear, said carrier being coupled to said driven shaft and said sun gear being coupled to said driving shaft; wherein differential action of said internal gear and said sun gear causes said unlocking means to move said lock member to said unlocked position when said driving shaft is rotated, and causes said locking means to move said lock member to said locked position.

2. An output shaft lock device comprising:

a driving shaft;

a driven shaft;

connecting means for connecting said driving shaft to said driven shaft to thereby form an output shaft, said connecting means forming a play angle in the rotating directions of said driving shaft and said driven shaft for not transmitting power therebetween;

a lock member disposed on said driven shaft;

locking means provided in said connecting means and adjacent to said driven shaft for moving said lock member to a locked position on said driven shaft;

unlocking means provided in said connecting means and adjacent to said driving shaft for moving said lock member to an unlocked position while said driving shaft is moved within said play angle, said unlocking means being operable by relative rotation between said driving shaft and said driven shaft; and planetary gear differential mechanism disposed between said driving shaft and said driven shaft and comprising an internal gear, a planetary gear, a sun gear, and a carrier supporting said planetary gear, said carrier being coupled to said driven shaft, and said sun gear being coupled to said driving shaft, wherein differential action of said internal gear and said sun gear and movement of said driven shaft cause said unlocking means to move said lock member to said unlocked position, and wherein said differential mechanism causes said locking means to move said lock member to said locked position.

3. An outupt shaft lock device comprising:

a driving shaft;

a driven shaft;

connecting means for connecting said driving shaft to said driven shaft to thereby form an output shaft, said connecting means forming a play angle in the rotating directions of said driving shaft and said driven shaft for not transmitting power therebetween;

a lock member disposed on said driven shaft;

locking means provided in said connecting means and adjacent to said driven shaft for moving said lock member to a locked position on said driven shaft;

an unlocking means provided in said connecting means and adjacent to said driving shaft for moving said lock member to an unlocked position while said driving shaft is moved within said play angle, said unlocking means comprising means for releasing said lock member from said unlocked position by reverse rotation of said driving shaft relative to said driven shaft; and a planetary gear differential mechanism disposed between said driving shaft and said driven shaft and comprising an internal gear, a planetary gear, a sun gear, and a carrier supporting said planetary gear, said carrier being coupled to said driven shaft, said sun gear being coupled to a brake member when said output shaft is stopped, and said internal gear being coupled to said unlocking means, wherein differential action of said internal gear and revolution of said planetary gear cause said unlocking means to be operated when said driven shaft is rotated, and wherein said planetary gear differential mechanism causes said lock member to be in said locked position.

4. An output shaft lock device comprising:

a driving shaft;

a driven shaft;

connecting means for connecting said driven shaft to said driving shaft to thereby form an output shaft, said connecting means forming a play angle in the rotating directions of said driving shaft and said driven shaft for not transmitting power therebetween;

a lock member disposed on said driven shaft;

locking means for moving said lock member to a locked position on said driven shaft;

unlocking means for moving said lock member to an unlocked position while said driving shaft is moved within said play angle, said unlocking means comprising means for causing said lock member to be released from said unlocked position by differential operation of said driving shaft and said driven shaft; and planetary gear differential means for providing said differential operation of said driving shaft and said driven shaft and for operation of said locking means to move said lock member to said locked position, said differential means comprising an internal gear, a planetary gear, a sun gear, and a carrier supporting said planetary gear, said carrier being coupled to a brake member when said output shaft is stopped, said internal gear being coupled to said unlocking means so that movement of said internal gear and said planetary gear causes said unlocking means to move said lock member to said unlocked position when said driven shaft is rotated, and wherein said differential means causes said lock member to be moved to said locked position.

5. The device of claim 1, 2, 3 or 4, further comprising a fixing member which is selectively formed in a ring shape and rotatably held in a fixing position, and a torque limiter comprising means for pressing and fixing said fixing member with a specified load.

6. The device of claim 1, 2, 3, or 4, further comprising a fixing member which is selectively formed in a ring shape and rotatably held in a fixing position, and a brake member comprising means for pressing and fixing said fixing member with a specified load.

7. An output shaft lock device comprising:

a driving shaft;

a driven shaft;

connecting means for connecting said driving shaft and said driven shaft to thereby form an output shaft, said connecting means forming a play angle in rotating directions of said driving shaft and said driven shaft for not transmitting power therebetween;

a lock member disposed on said driven shaft;

locking means for moving said lock member to a locked position on said driven shaft;

unlocking means for moving said lock member to an unlocked position while said driving shaft is moved within said play angle;

a fixing member formed in a ring shape and rotatably held in a fixing position; and a torque limiter comprising means for pressing and fixing said fixing member with a specified load.

8. An output shaft lock device comprising:

a driving shaft;

a driven shaft;

connecting means for connecting said driving shaft to said driven shaft to thereby form an output shaft, said connecting means forming a play angle in rotation directions of said driving shaft and said driven shaft for not transmitting power therebetweeen;

a lock member disposed on said driven shaft;

locking means for moving said lock member to a locked position on said driven shaft;

unlocking means for moving said lock member to an unlocked position while said driving shaft is moved within said play angle;

fixing member formed in a ring shape and rotatably held in a fixing position; and brake member comprising means for fixing and pressing said fixing member with a specified load.

9. The device of claim 1, 2, 3, 4, 7 or 8, wherein said lock member comprises a plurality of lock pawls formed in a circumferential direction of said driven shaft.

10. The device of claim 1, 2, 3, 4, 7 or 8, further comprising a second lock member, and wherein said unlocking means comprises pins formed on said first mentioned lock member and cam holes formed in said second lock member, wherein said play angle at an initial phase of rotation of said driving shaft is disposed so that said cam holes abut against said pins to cause said one lock member to be in said unlocked position.

11. The device of claim 2, 4, 7 or 8, wherein said unlocking means comprises means for causing said locking member to be released from said unlocked position by reverse rotation of said driving shaft relative to said driven shaft.

12. The device of claim 7 or 8, wherein said locking means comprises means for causing said lock member to be released from said unlocked position by differential operation of said driving shaft and said driven shaft, and means for manipulating said lock member to be in said locked position by differential operation of said driving shaft and said driven shaft.

13. An output shaft lock device comprising:

a driven shaft;

a driving shaft;

connecting means for connecting said driving shaft to said driven shaft to thereby form an output shaft, said connecting means forming a play angle in rotational directions of said driving shaft and said driven shaft for not transmitting power therebetween;

a lock member disposed on said driven shaft;

locking means for moving said lock member to a locked position on said driven shaft; and unlocking means for moving said lock member to an unlocked position while said driving shaft is moved within said play angle;

wherein said unlocking means comprises pins formed on one portion of said unlocking means and cam holes formed on another portion of said unlocking means, and wherein during an initial phase of rotation of said driving shaft over the play angle, said cam holes abut against said pins to move said lock member to said unlocked position.

14. The device of claim 13, wherein said lock member comprises a fixed member, lock pawls, and stopping pawls formed on said fixed member for engaging and disengaging said lock pawls.

15. The device of claim 13, wherein said unlocking means is caused to operate by reverse rotation of said driving shaft relative to said driven shaft.

16. The device of claim 13, wherein said locking means comprises means for causing said lock member to be released from said unlocked position by differential operation of said driving shaft and said driven shaft over said play angle, and means for manipulating said lock member to said locked position by differential action of said driving shaft and said driven shaft.

17. The device of claim 13, 14, 15 or 16, wherein said lock member comprises a plurality of pawls formed in a circumferential direction of said driven shaft.

18. An output shaft lock device comprising:

a driving shaft;

a driven shaft;

connecting means for connecting said driving shaft to said driven shaft thereby to form an output shaft, said connecting means forming a play angle in the rotational directions of said driving shaft and said driven shaft for not transmitting power therebetween;

two lock members disposed on said driven shaft;

locking means for moving said two lock members to a locked position on said driven shaft, said locking means comprising spring means for moving said two lock members to said locked position; and unlocking means for moving said two lock members to an unlocked position while said driven shaft is moved within said play angle;

wherein said two lock members comprise a fixed member, lock pawls, and stopping pawls formed on said fixed member for engaging and disengaging said lock pawls, pins being formed on one portion of said unlocking means and cam holes formed on another portion of said unlocking means;

whereby rotation of said driving shaft over said play angle abuts said cam holes against said pins to move said two lock members to said unlocked postion;

wherein said unlocking means operates by reverse rotation of said driving shaft relative to said driven shaft; and wherein said two lock members are formed in a circumferential direction of said driven shaft.

19. The device of claim 18, wherein said locking means comprises means for causing said two members to said unlocked position by differential operation of said driving shaft and said driven shaft over said play angle; and further comprising differential means disposed between said driving shaft and said driven shaft for causing said locking means to move said two lock members to said locked position.

20. The device of claim 18, whrein said locking means comprises: a planetary gear, an internal gear, a sun gear, and a carrier supporting said planetary gear, said carrier being coupled to said driven shaft and said sun gear being coupled to said driving shaft; and wherein differential action of said internal gear and said sun gear causes said unlocking means to move said two lock members to said unlocked position when said driven shaft is rotated, and wherein said differential action causes said locking means to move said two lock members to said locked position.

21. The device of claim 18, wherein said locking means comprises: an internal gear, a planetary gear, a sun gear, and a carrier supporting said planetary gear, said carrier being coupled to said driven shaft, and said sun gear being coupled to a brake member fixed when said output shaft is stopped, said internal gear being coupled to said unlocking means, and wherein differential action of said planetary gear causes said two lock members to be moved when said driven shaft is rotated.

22. The device of claim 18, 19, 20 or 21, wherein said fixed member is formed in a ring shape, and is rotatably held in a fixing position, and further comprising a torque limiter which presses and fixes said fixed member with a specified load.

23. The device of claim 18, 19, 20, or 21, wherein said fixed member is formed in a ring shape, and is rotatably held in a fixing position, and further comprising a brake which presses and fixes said fixed member with a specified load.

* * * * *